(12) United States Patent
Scarborough

(10) Patent No.: US 11,565,767 B2
(45) Date of Patent: Jan. 31, 2023

(54) COMPOUND TORQUE MULTIPLYING LEVER PROPELLED BICYCLE

(71) Applicant: Rashad Na'im Scarborough, Durham, NC (US)

(72) Inventor: Rashad Na'im Scarborough, Durham, NC (US)

(\*) Notice: Subject to any disclaimer, the term of this patent is extended or adjusted under 35 U.S.C. 154(b) by 815 days.

(21) Appl. No.: 16/436,858

(22) Filed: Jun. 10, 2019

(65) Prior Publication Data

US 2019/0389534 A1    Dec. 26, 2019

Related U.S. Application Data

(60) Provisional application No. 62/763,596, filed on Jun. 21, 2018.

(51) Int. Cl.
*B62M 1/30* (2013.01)
*B62M 1/28* (2013.01)

(52) U.S. Cl.
CPC ............. *B62M 1/30* (2013.01); *B62M 1/28* (2013.01)

(58) Field of Classification Search
CPC .................................. B62M 1/28; B62M 1/30
See application file for complete search history.

(56) References Cited

U.S. PATENT DOCUMENTS

| | | | | |
|---|---|---|---|---|
| 3,661,404 A * | 5/1972 | Bossaer | ............. | B62M 1/28 280/258 |
| 3,834,733 A * | 9/1974 | Harris | ............. | B62M 1/28 280/251 |
| 3,862,579 A * | 1/1975 | Roberts | ............. | B62M 1/28 280/251 |
| 4,227,712 A * | 10/1980 | Dick | ............. | B62M 1/28 280/258 |
| 4,574,649 A * | 3/1986 | Seol | ............. | B62M 9/04 192/28 |
| 5,335,927 A * | 8/1994 | Islas | ............. | B62M 1/28 280/255 |
| 6,173,981 B1 * | 1/2001 | Coleman | ............. | B62K 3/002 280/253 |
| 8,632,089 B1 * | 1/2014 | Bezerra | ............. | B62M 1/28 280/252 |
| 2006/0055144 A1 * | 3/2006 | Norman | ............. | B62M 1/28 280/251 |
| 2018/0127052 A1 * | 5/2018 | Scarborough | ............. | B62M 1/28 |

FOREIGN PATENT DOCUMENTS

CN    85204908 U  *  8/1986
DE    3831890 A1  *  2/1989

\* cited by examiner

*Primary Examiner* — Jacob D Knutson

(57) ABSTRACT

The Compound Torque Multiplying Lever Propelled Bicycle uses two force multiplying machines to generate a large amount of torque to be applied directly to the sprocket of the rear wheel. This machine uses a lever machine as a means of mechanical advantage and a two gear combination machine as a means of mechanical advantage. In this configuration, the input gear is always larger than the output gear or sprocket. Furthermore, because the load of each lever machine is moved away from the fulcrum and closer to the pedals, less material is needed to reinforce the lever machines from the inside; thus, they are lighter. Furthermore, because the sprockets used to increase torque and range are smaller in diameter, they are then lighter, which would result in a bicycle that is lighter, having consistent increased torque from pedal peak to pedal base with a substantial amount of range.

5 Claims, 25 Drawing Sheets

FIG. 19 SECTION AA

FIG. 20 SECTION BB

COMPOUND TORQUE MULTIPLYING LEVER PROPELLED BICYCLE

CROSS-REFERENCE TO RELATED APPLICATIONS

Figure 1:
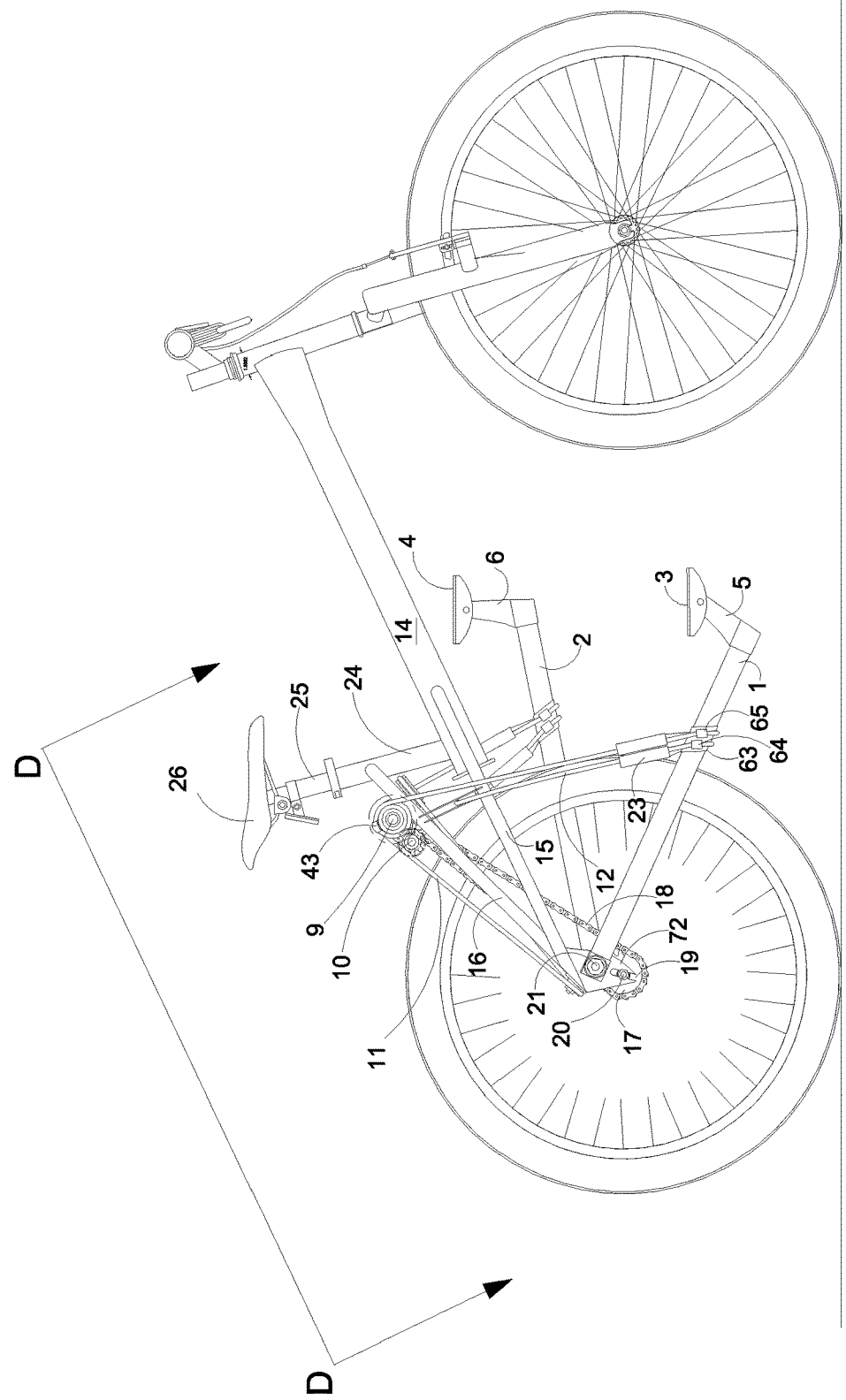

This application claims the benefit of provisional patent application Ser. No. 62/763,596 filed 2018 Jun. 21 by the present inventor.

BACKGROUND—PRIOR ART

The following is a tabulation of some prior art that presently appears relevant:

U.S. Patents

| Pat. No. | Kind Code | Issue Date | Patentee |
|---|---|---|---|
| 4,666,173 | B62M | 1987 May 19 | Graham |
| 8,632,089 | B1 | 2014 Jan. 21 | Bezerra |
| 9,902,461 | B2 | 2018 Feb. 27 | Bezerra |
| 5,716,069 | | 1998 Feb. 10 | Bezerra |
| 5,405,157 | | 1995 Apr. 11 | Bezerra |

Many of the prior art in the niche of lever propelled bicycles have tried to penetrate the bicycle market, but have not achieved this concept to a level where it has been noticeable. For a machine having gravitational advantage, one may ask, why have I not seen these bikes sold in Wal-Mart or other major retailers. This is because those bicycles have yet to equal the pedaling propulsion performance of a conventional bicycle. If there is a lot of torque, then the bicycle is too heavy or it may not have an efficient multispeed system for the design configuration of the lever machine or the type of lever propelled bicycle designed could only be a single speed bike.

Several prior designs have been, through rational observation, seen to work, but not been seen in the market place. Graham illustrates the Foot Pedal Drive for Bicycles in U.S. Pat. No. 4,666,173. The bicycle has the ability to work, but not outperform what has already been established. The bicycle has gravitational advantage by providing vertical pedaling. Furthermore, this bicycle has a breakthrough means of allowing conventional multispeed controls to be installed in the rear wheel, which would be compatible with this system. However, this system is an addition to a conventional frame structure, which would cause the bicycle to outweigh what it was replacing; which is the crank arm and chainring. The chainring is positioned above the rear wheel and has approximately 25 teeth. There are tubes extending from the seat post and from the rear wheel drop out plate, with the addition of the long lever machines distributing effort along its length. All of these components would outweigh a crank arm and chainring, thus rendering the bicycle too heavy when matched against what is established.

Similar issues can be seen in Bezerra's invention of the Mechanism for Converting Reciprocal Motion to Rotary Motion (U.S. Pat. No. 8,632,089). Again here is a lever propulsion system added to a conventional frame, which through observation is heavier that a chainring and crank arm. Thus, even if this bicycle did have mechanical advantage, its burdensome weight would deplete its performance.

Whenever lever machines are added to a bicycle frame, one must design a frame that displaces it weight and transfers this weight to the lever machines so that the bicycle does not take on extra weight beyond what is standard in the bicycle industry. One must master increasing torque, maintaining sufficient amount of range, while decreasing the weight of the bicycle. This concept is only limited to the traditional bicycle metals like chromoly, titanium and aluminum. When it comes to carbon fiber, the nature of the lever machine demands the extra weight increase although mechanical advantage may be greater. For example, if a manufacturer wanted to build a lever propelled bicycle comparable to a standard chromoly bicycle, the central tube would have to be made out of 7075 or 2024 aluminum while the stirring cylinder, seat post cylinder and forks would be made out of chromoly. This would make sense because aluminum weighs ⅓ the weight of steel. So, this is why it would make sense to make the center tube twice as wide as one chromoly tube. So, if it is the norm to use a 1" chromoly tube as the top tube in a frame, then the center tube in a frame for a lever machine should be made out of 6061 or 2024 aluminum with an O.D. of 2" to balance the weight. Then this tube can be glued to the chromoly joint steering welded assembly with a 3M aerospace resin, as well as the rear end of the tube. The lever tubes would take the place of the down tube and seat post tube of the traditional bicycle to prevent a weight increase. Both tubes should be about 1.25" in diameter while being reinforced with a chromoly beam, which at the front ascends through a notch in the front of the tube to form the pedal mount.

Advantages

These are the advantages the Compound Torque Multiplying Machine offers:
  Vector Force Advantage
  Mechanical Advantage
  Gravitational Advantage Vector force advantage is a property that is not offered by conventional bicycles, when compared to the new lever propelled bicycle. This is because the Compound Torque Multiplying Lever Propelled Bicycle or CTMLPB provides a means to apply force to the pedals in a way where the direction of force is almost constantly perpendicular to the lever machine or length of the lever machine it is applied to. The angle of force applied to the length of the lever machine fluctuate approximately between 70 to 110 degrees. However, a conventional bicycle's pedal at 90 degrees will have a vector of force that will be against the crank axle of the bicycle, forcing the rider to use mainly leg muscles at that point, instead of leg muscles in combination with that person's body weight. Even if the rider of the CTMLPB, was in an atmosphere where gravity did not exist, the vector of force would not point against the fulcrum of this lever machine, rather it would have an almost consistent perpendicular position to the fulcrum. Likewise, the amount of force pulling on the load, be it a chain or steel cable would almost be consistent from the pedaling peak to pedaling base.

Mechanical advantage is a characteristic that is unique the CTMLPB. In fact, this design has two force multiplying machines used to propel the rider. The most noticeable is the lever machine. This machine has mechanical advantage of 1.54. Thus, if you stood on the pedals of both lever machines and pedaled one lever downward; if you weighed 200 lbs. you would be exerting a force of 308 lbs. on the load, which could be a chain or steel cable. Furthermore, in this design, the elevated crank sprocket has been reduced in size dramatically when compared to the design in my last patent application Ser. No. 15/782,992. The Lever Enhanced Pedaling System with Elevated Crank Sprockets (Ser. No. 15/782,992) had a 20-tooth crank sprocket, while the CTMLPB has an 8-tooth crank sprocket. In fact, this crank sprocket is smaller than its adjacent 13 tooth freewheel sprockets on the left and right of it. This change was necessary, in order to create a torque force multiplying machine out of these three sprocket combinations on the same axle.

So a torque force multiplying gear machine, is much like a small lever machine that is duplicated multiple times equally 360 degrees with the fulcrum being the axle. So, the area of applied force would be the pitch diameter, in which the chain makes contact with the sprocket teeth. This chain or cable would turn the cylinder 33 coupled to the axle 9 in a forward direction. The same axle 9 would turn the smaller sprocket, which is the 8-tooth sprocket in the same direction. The 8-tooth sprocket's pitch diameter would then rotate and move the drive chain (The Load), which would transfer this force to the sprocket within it opposite orbit of chain movement, within the rear wheel. The 13-tooth sprocket has a pitch diameter of 2.08929 inches. The 8-tooth sprocket has a pitch diameter of 1.30656 inches. Thus, in order to find the torque output of this torque multiplying machine, one must divide the input gear (13 tooth sprocket) by the output gear (8 tooth sprocket) to get this machines torque output. So, 2.08929 divided by 1.30656 equals 1.599. Thus, this machine by itself produces a torque output of 1.599.

Thus, in order to get the total torque output of the lever machine and Input/Output sprockets, you would have to multiply the lever machine's output (1.53959323) to the Input/Output crank sprocket's output (1.59907696) in order to get a total output of 2.46180958. So now when the lever machine by itself only produces a force of 308 lbs. from a person weighing 200 lbs., this new compound of force multiplying machines now transforms a person weighing 200 lbs. into 492 lbs. of torque. Furthermore, this force is almost consistent from pedaling peak to the base of the pedaling stroke, although there is a slight reduction in gravitational force at the equilibrium of pedals. Because when each both pedals are at equal levels, the pedal being moved upward above its adjacent pedal, is contributing to extra force needed to lift it in a pivoting manner above its adjacent lever machine. However, this extra weight needed is not a significant reduction in torque. This means that the torque output on the rear wheel is greatest at the bicycles peak pedaling position than at its middle pedaling position.

Gravitational Advantage

As said before, at the peak pedaling position is when this bicycle is at its greatest torque output, due to the gravity equilibrium laws. This equilibrium works much like a balance scale. (See provisional patent application 62/763,596 in the uspto public PAIR for omitted illustration)

Because when forces on an object, for example like the weight of the pedals, are equal in size, but opposite in direction, they try to balance each other out.

(See provisional patent application 62/763,596 in the uspto public PAIR for omitted illustration)

So when one pedal is above the other, gravity is working on the highest one to make it equal to its adjacent pedal.

(See provisional patent application 62/763,596 in the uspto public PAIR for omitted illustration)

Gravity wants to make these pedals on an equal level (See provisional patent application 62/763,596 in the uspto public PAIR for omitted illustration)

So once each pedal and lever machine that are equal in size are on an equal level in this balance scale like configuration, slightly more force would be needed to lift the adjacent lever machine above the lever machine where downward force is applied, because now gravity has constant pull on the pedal being elevated above the formerly elevated pedal.

(See provisional patent application 62/763,596 in the uspto public PAIR for omitted illustration)

This extra pull on the pedal being pedaled below its adjacent pedal does not significantly reduce the strength of the force output of the lever machine having downward force applied to it. There was a digital scale test conducted in order to observe how much force the Lever Enhanced Pedaling System with Elevated Crank Sprocket (Ser. No. 15/782,992) could crank out verses a conventional bicycle. So I placed a bundle of barbells weights wrapped in duct tape and hung them on a pedal at its highest peak. Then I took a PVC pipe and taped it the steering cylinder. I then got a digital scale and placed it between two boards on a sheet of ply wood and placed the plywood against the wall. I tied a string to the bicycle's frame and tied the opposite side of the string to a steel weight to hold the bicycle up. I then let the bicycle move against the scale using the PVC pipe as a means of contact. So, at the peak pedaling position the digital scale read above 10 lbs. of forward pressure. At the middle of the pedaling peak, the bicycle read 8 lbs. 2 oz and at the near peak pedal position over 10 lbs.

(See provisional patent application 62/763,596 in the uspto public PAIR for omitted illustration)

The same thing was done using the same weight for a conventional bicycle. At the pedaling peak the bicycle yielded 15 oz of forward pressure. At the pedals near peak the bicycle yielded 5 lbs. 1 oz of forward pressure and at the middle pedal position, which was 180 degrees, the bicycle yielded 7 lbs. and 15 oz. Thus, on average, from pedaling peak to pedaling base the CTMLPB is going to yield more torque for a full downward stroke. This is because at the pedaling peak, a conventional bicycle will position the rider to pedal against the axle of the crank sprocket forcing the rider the only option to move the pedal at 180 degrees when the crank arm is at 90 degrees. Thus, the rider could not take advantage of his or her weight or gravity at this point and could only use his or her leg muscles to move the pedal 180 degrees. On the CTMLPB, the fulcrum is opposite from the pedals and from those two points it is almost perpendicular to the curved linear path of the pedals. Here is an example of what pedaling advantages the CTMLPB has over a conventional bicycle.

(See provisional patent application 62/763,596 in the uspto public PAIR for omitted illustration)

Thus, as you can see, leg muscles plus body weight produces more propulsion force than a bicycle that uses only leg muscles when the pedal is at a 90-degree pedaling peak position.

DRAWINGS—FIGURES WITH DESCRIPTION

Figure 6:
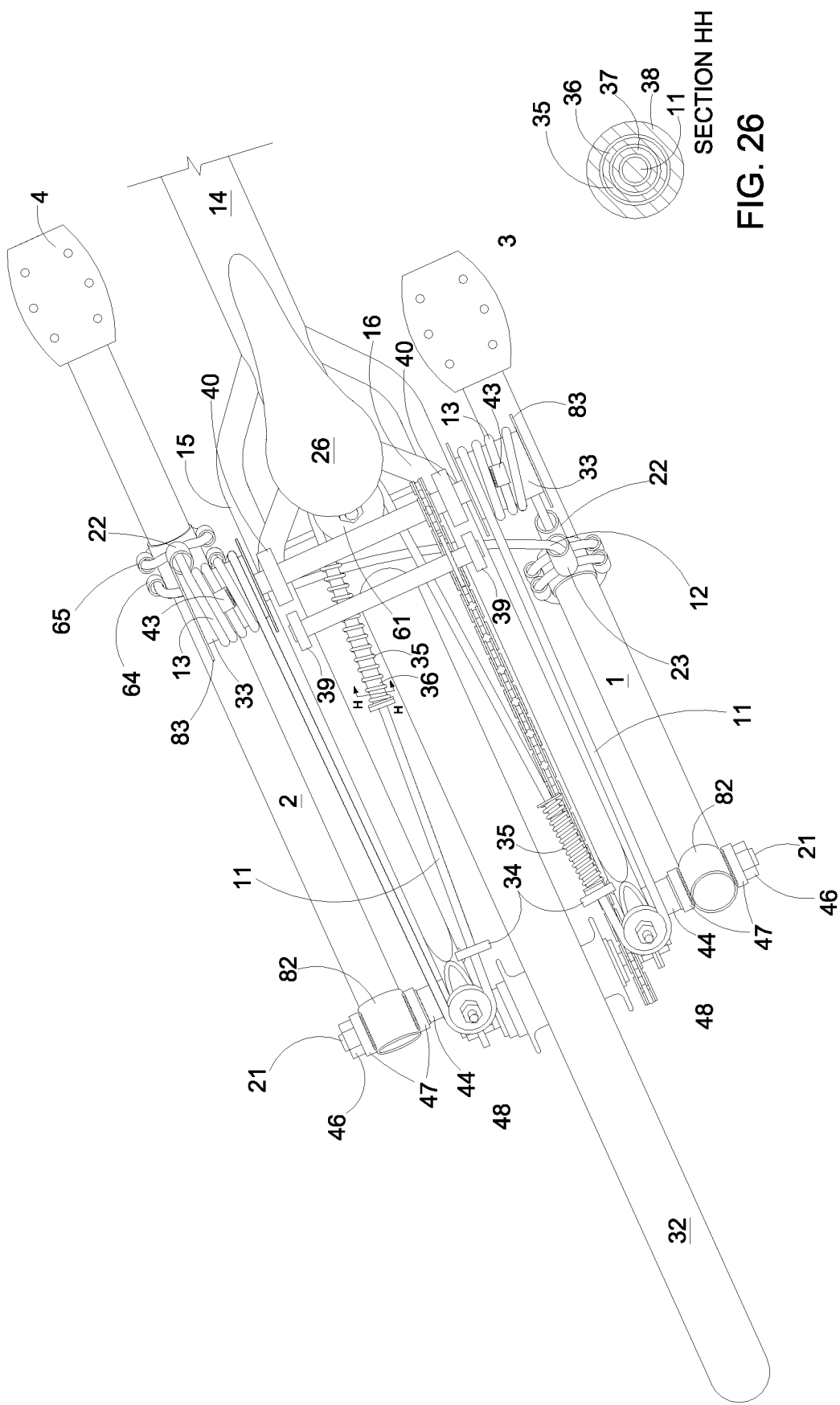

FIG. 1 shows a right view of the bicycle's steel cable variant propulsion system. This is a lever propelled bicycle wherein each lever machine (1 & 2) pulls its own steel cable 13 that is wrapped around a cylinder 33, which coils around its member cylinder 33 from front to back until it is glued in place within a smaller cylinder 43 about ⅜ inches of outer diameter. This cylinder 43 is welded at an angle to it member cylinder 33 so that the steel cable that is glued within it, will be prevented from wrapping around itself. The type of resin used to keep this steel cable from slipping out of this cylinder 43 is the 3 M DP 430 aerospace types for high quality fixing. Beyond this point the steel cable continues to wrap around its member cylinder 33 towards the back of the bicycles frame 14 within the grooves of its member pulley wheel 48, then inwardly, then forwardly towards the seat 26 into a bigger pulley wheel 61 mounted to the center of the frame 14. Then the steel cable 11 occupies the groove of this central pulley wheel 61 mounted centrally to the rear portion of the frame 14 and wrapped around it in a U-shape and proceed towards the rear of the frame 14 towards its second pulley wheel 48. Then wraps around it in a U-shape to proceed back towards the front of the frame 14 to wrap around a horizontal cylinder 33 (FIG. 6). This cylinder 33 is made out of chromoly and the inner edge of the cylinder is coupled to a bearing that has an I.D. of 0.625" and O.D. 1.375". In order to allow the cylinder to rest on the bearing, an aluminum spacer must be added to the bearing around its outer curved surface, glued with 3M DP 420 and have an outer diameter that meets the inner diameter of the drive cylinder 33. This connection can be glued with 3M DP 420 resin. Furthermore, at this edge is a washer like ring 62 welded in place that have walls which prevent the steel cable 11 from slipping off of the cylinder 33. A portion of this cable 11 is glued inside its member small cylinder 43 welded to the drive cylinder 33. Furthermore, there is a failsafe mechanism, which is composed of a second steel cable 12, which loops around the chromoly cylinder 63. This chromoly cylinder 63 has a pair of smaller chromoly cylinders 64 that is welded to the opposite sides of this chromoly cylinder 63 in order to fix opposite sides of the loop of the failsafe cable 12. The loop of the failsafe cable 12 is glued in place by 3M DP 420 resin within the cylinder 23. This cylinder 23 has the ability to collide with the frame portions 30, which is a set of parallel beams housing a pulley wheel at its base to reduce friction. This collision would happen if a part that holds the steel cable 11 in place for backwards and forwards reciprocation, like the welded foundation of a pulley wheel, where to break off then this cylinder 23 would collide with frame portion 30 and prevent a rider from hitting the ground.

Figure 2:
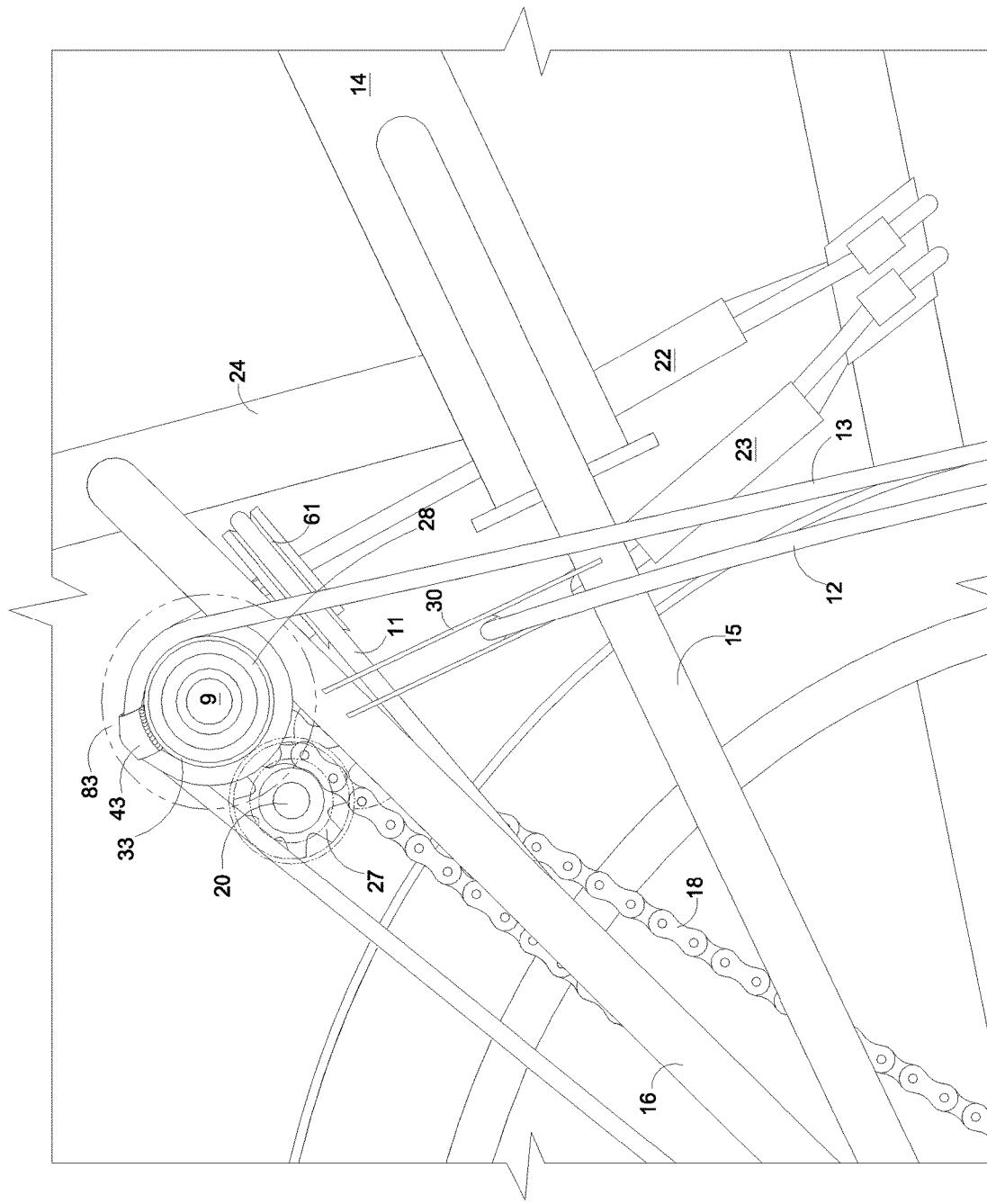

FIG. 2 shows a right side zoomed in view of the steel cable drive spiral variant. Thus, you should be able to see more details of the modified sprocket 28, wherein the sprocket 28 teeth are removed to accommodate the cylinder 33 around its rim surface area. This cylinder's 33 inner surface would be glued to outer rim surface of the freewheel 13 tooth sprocket 28. Behind this modified sprocket 28 is a fixed 8 tooth sprocket 41 welded to the axle 9 by the tig welding process. A duplicate sprocket having an inner diameter of 0.50 inches is 3M glued to a carbon fiber tube used as a shaft 20 and reinforce with a chromoly rod for quality. This rod would be glued with the 3M resin. This duplicate 8 tooth sprocket 27 is an anti-slip sprocket 27 configured to prevent the transmission chain 18 from slipping off of the eight-tooth crank sprocket 41 under high torque pressure. This picture also shows how the central pulley wheel 31 is positioned on the frame 14 to help reciprocate the reciprocal portion of the spiral cable 11. Further the details of the beams 30 and how they house the pulley wheel 65 to reduce the friction of the failsafe cable 12 as it slides back and forth through the forks 15 and 16 of the frame 14.

Figure 3:
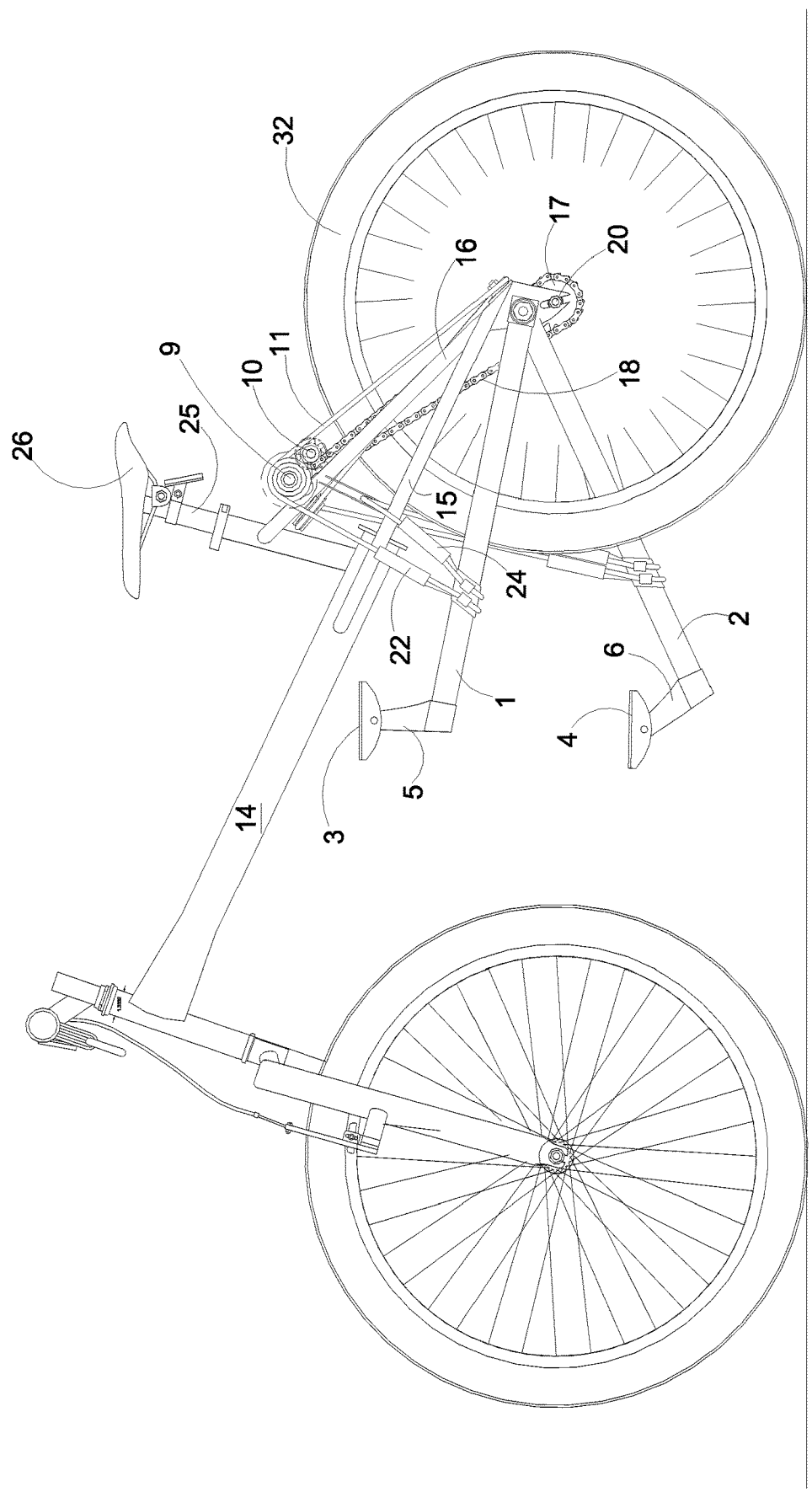

FIG. 3 shows the left side of the steel cable 13 spiral variant of the bicycle. It should be understood that the reciprocal side or the steel cable is 11 and the drive side or load being pulled by a member lever machine is 13. Furthermore, this illustration reveals how this machine looks on the left side of the bicycle when the left lever machine is elevated. The metal cylinder 23 comes close to the beams 30, but does not collide with them 30. The cylinder 43 (FIG. 6) is now below the cylinder 33 because the steel cable 13 is wrapped around its member cylinder 33 in a position to rotate it 540 degrees or 1 and a half rotation for substantial range.

Figure 4:
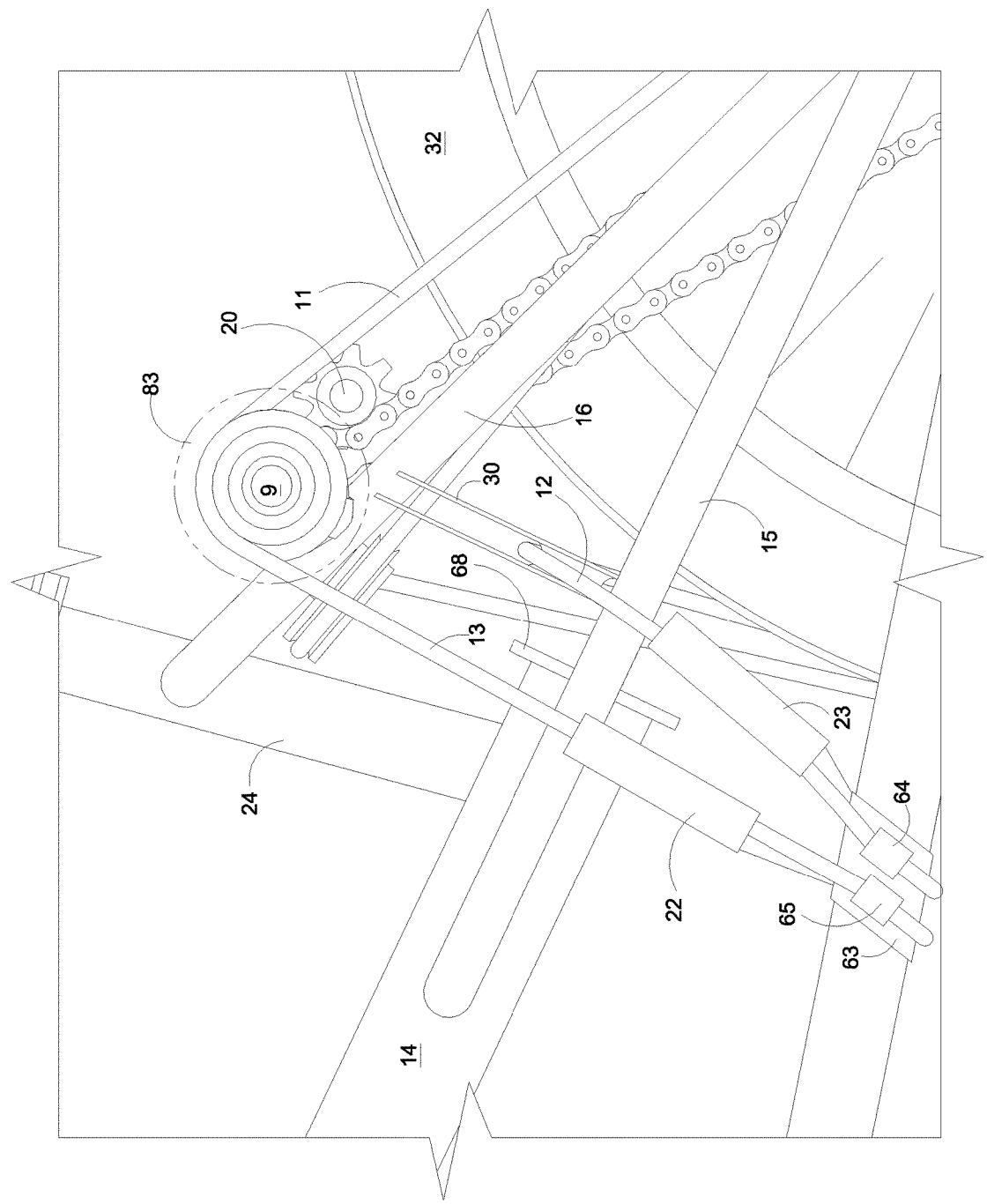

FIG. 4 shows a zoomed-in version of FIG. 3 homing in on the new and critical components of the mechanical configuration. It illustrates how the central plate 68 bridges both fork tubes to create a stable frame 14. It further illustrates how the fork tubes 16 are bridge together by tube 24 to create a stable bike frame.

Figure 5:
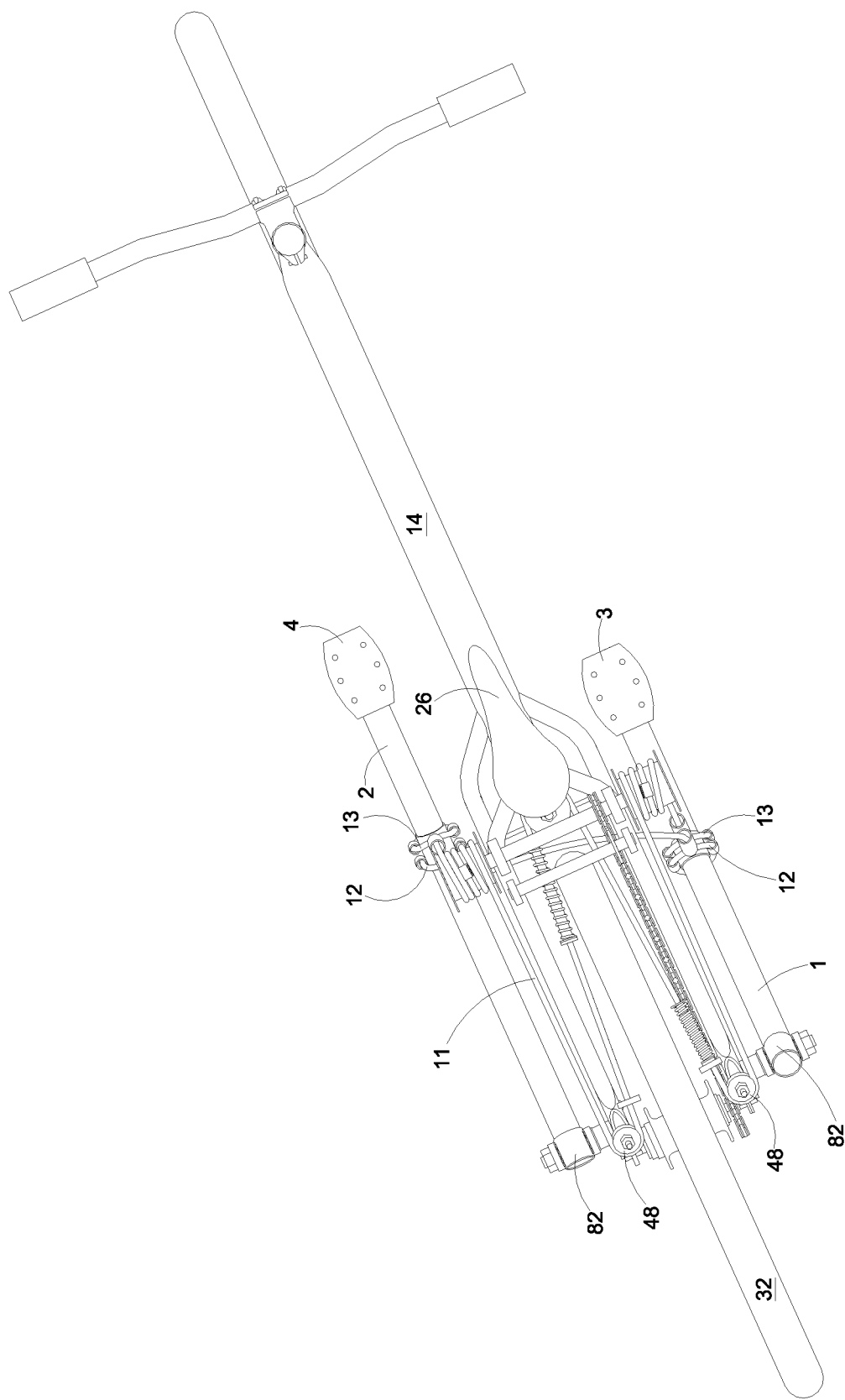

FIG. 5 shows a bird's eye view of the spiral drive variant and how drive cable 13 is looped around the chromoly cylinder 63, which is glued around lever tube of the lever machine 1 and 2 by the 3M DP 420 resin. The tube of each lever machine is usually composed of a very light material since both have a lot of surface area and can weigh down the bicycle if a dense material was used. Most preferably aluminum or carbon fiber would be within this chromoly cylinder 63. Chromoly will be the best choice for this area since this is a weight bearing point. It further shows the spring 35 compressed at the rear of the machine on the right side when pedal 3 depressed downward to its base position. The left spring 35 is uncompressed and it is closer to the front of the bicycle. But this configuration could be easily switched with the left compression spring 35 and sliding tube assembly glued closer to the front of the bicycle with the casing holding the central pulley wheel and right compression spring 35 assembly with sliding tubes glued around the steel cable 11 away from the rear of the tube so as to not collide with the rear perpendicular aluminum bar protrusion 68 in order that the left compression spring assembly compress when the right pedal 3 is pushed to its base level, while the right spring 35 stays uncompressed and vice versa. Each pedal (3 and 4) is able to pivot on pedal mounts (5 and 6).

FIG. 6 shows a zoomed-in version of FIG. 5. It is clear how the failsafe cable 12 is looped within the frame 14 and visualized between axles 9 and 20. Furthermore, central pulley wheel 61 is below the seat 26, while the drive axle 9 is 0.625" and made of hardened heat-treated steel why the anti-slip axle 20 is smaller in diameter (0.50) and made primarily of ultra-high modulus carbon fiber.

Figure 7:
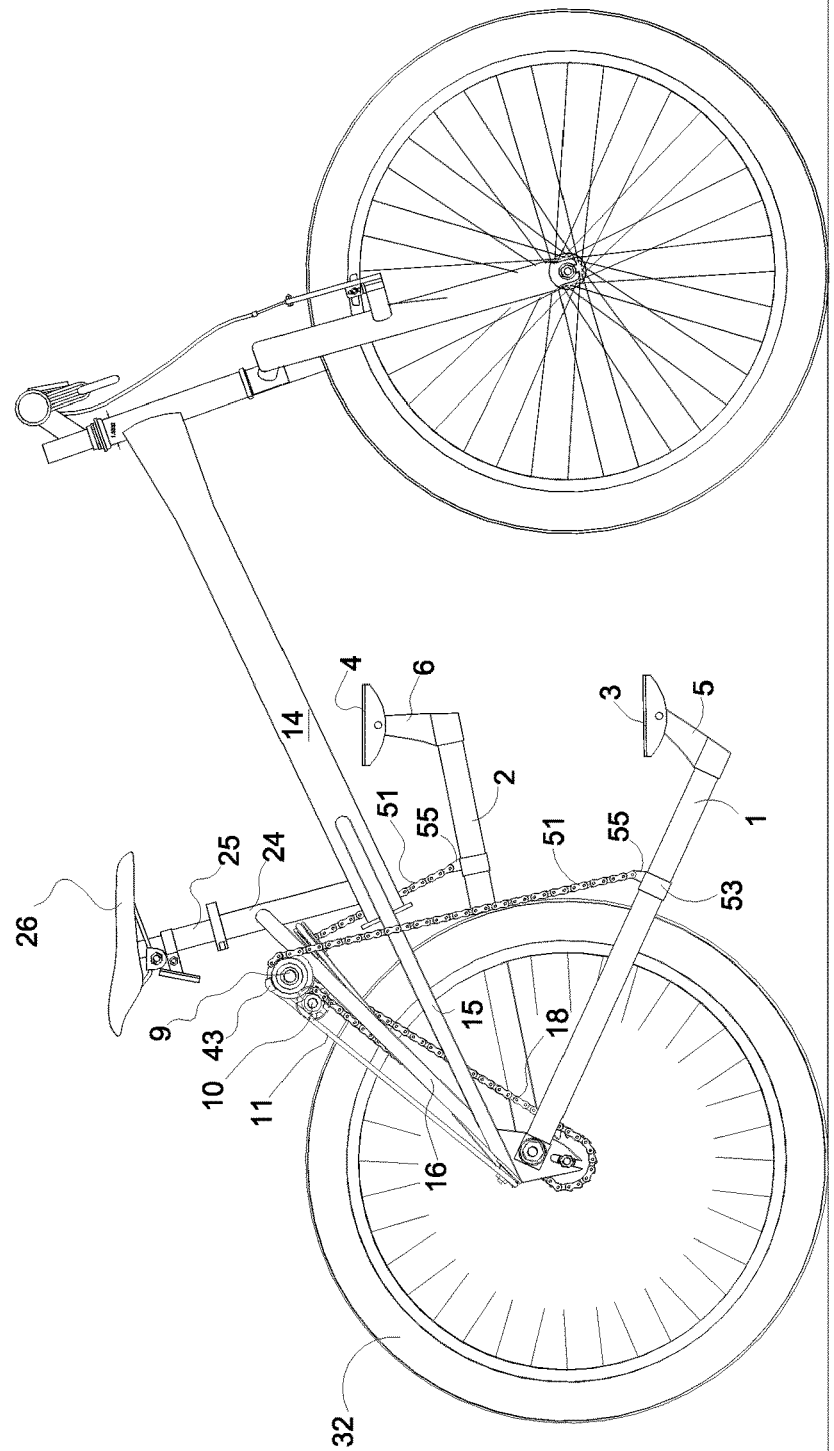

FIG. 7 shows a combination of a chain that wraps around the steel cylinder 33 what having a steel cable reciprocal portion 11 glued inside the cylinder 43. The upper ends of 2 duplicate chains 70 a welded to his member cylinder 33. the bottom of these two chains are connected to a single chain 71 by spacer and steel rods within them that occupy the aligned bottom bores of the two parallel bottom chain links 71. Each duplicate chain links have has 7 outer links. Both parallel chain links are designed to support the single chain 71 vertically to keep it 90 degrees from the connection from their member cylinder 33. This 90-degree position of the single chain 50 is centrally aligned to its member lever machine. A triangular piece 54 welded to a chromoly cylinder 52 is between the space in the link and is welded to this piece with pivotal ability. So, when the left side cylinder is rotated by the pulling of the lever machine 2 on it, it will rotate the drive axle 9 and pull the steel cable in its direction while reeling up the right single chain 50 around its member cylinder 33. Because each cylinder 33 is glued by 3M resin to a freewheel 13 tooth sprocket 28 each sprocket has the ability to move the drive axle forward while causing its opposite free wheel sprocket 28 to rotate backwards and slip in reverse while its drive axle 8 rotates forwards. All sprockets 28 on all three variants have forward turn, backwards slip ability. The reason why both duplicate chains is offset by a spacer is to allow the single chain 50 or 51 it is connected to, to wrap around its member cylinder 33. The pair of duplicate chains would wrap 360 degrees, then the single chain 50 would continue to wrap around the same cylinder between the duplicate chains for about 180 degrees.

Figure 8:
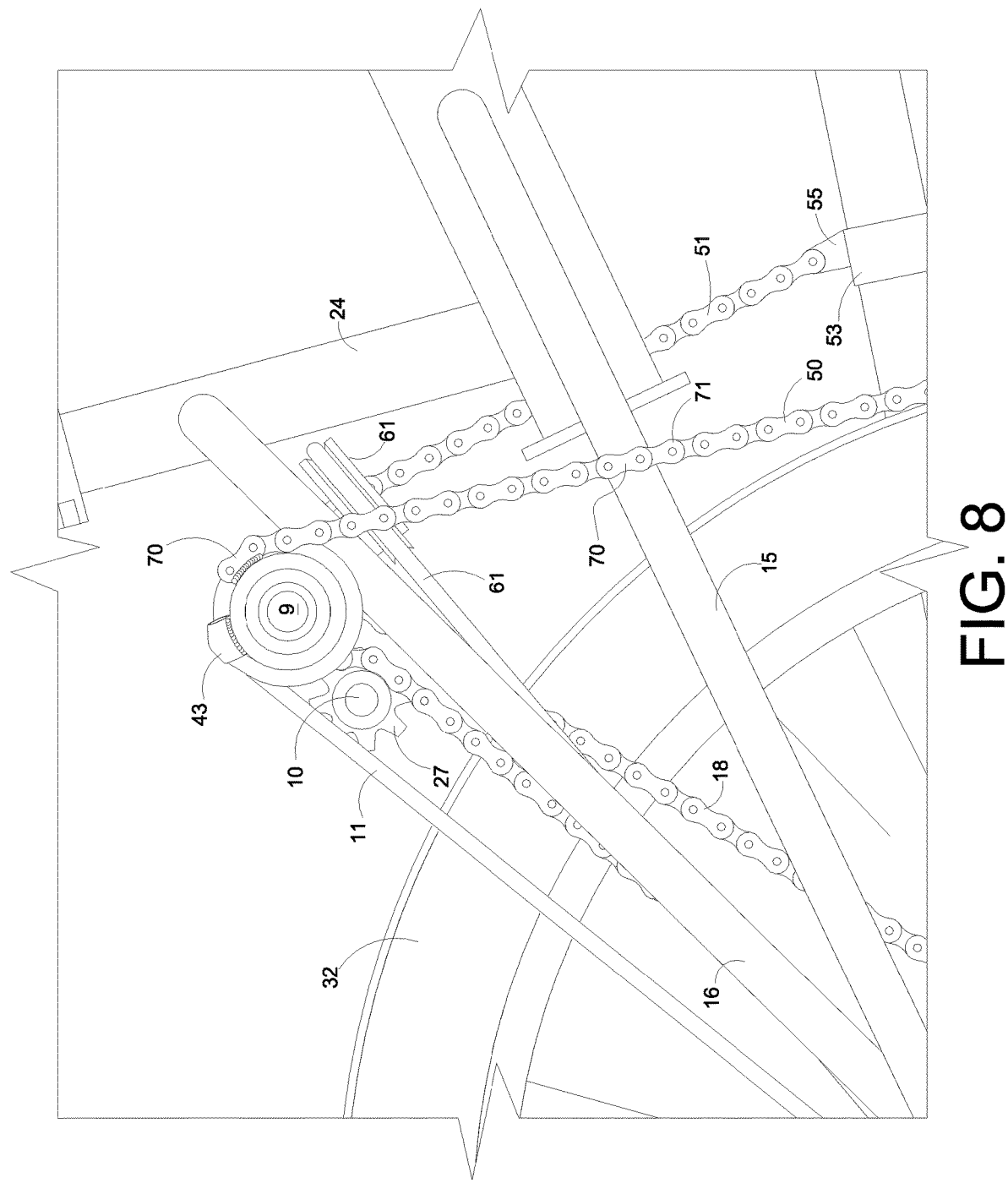

FIG. 8 shows a zoomed in version of FIG. 7. Thus, you can see how the upper chain link is tig welded to its member cylinder 33.

Figure 9:
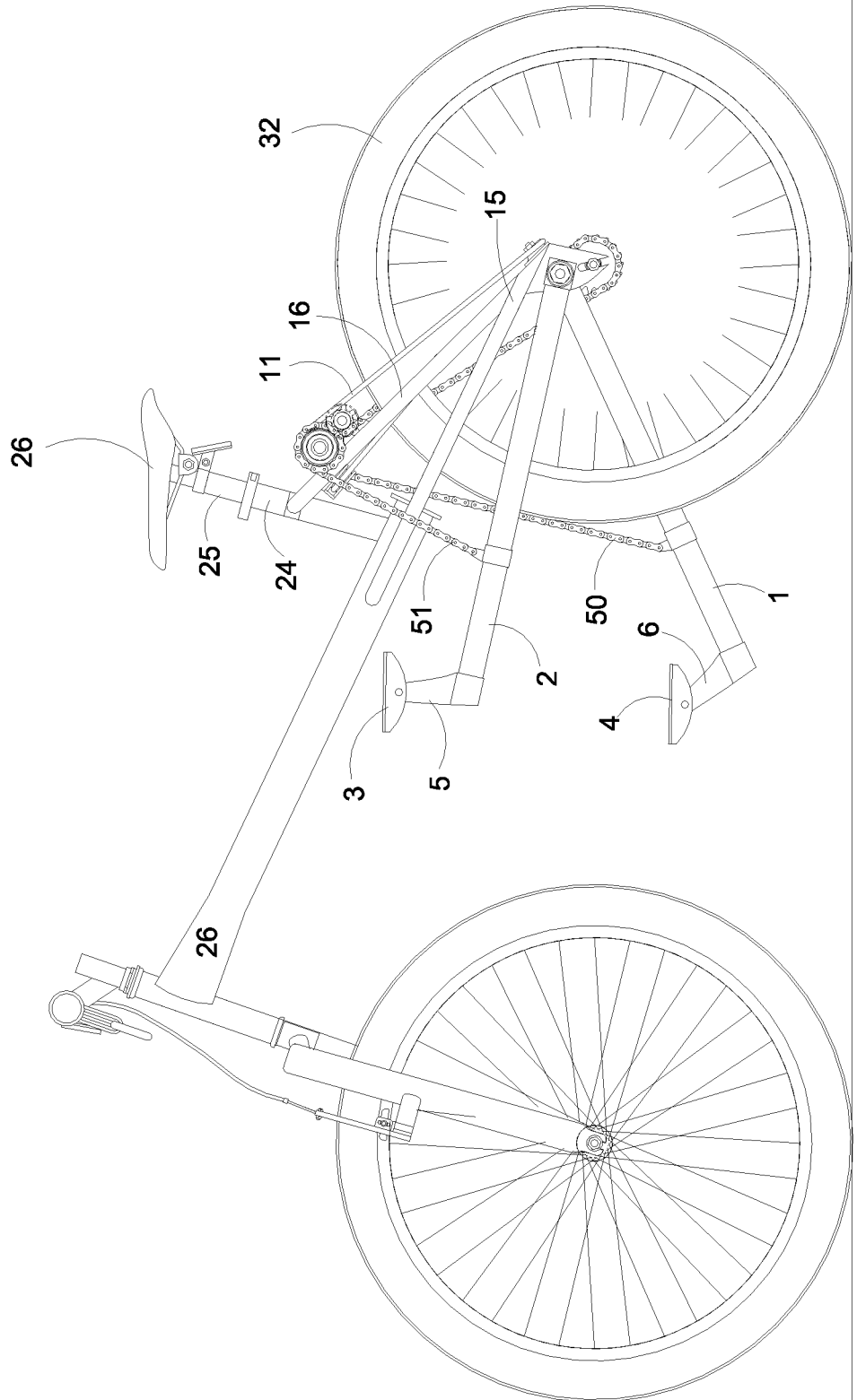

FIG. 9 shows a left side version of the chain and steel cable variant. The duplicate chains 70 are wrapped around the cylinder 360 degrees and over laps the single chain 51.

Figure 10:
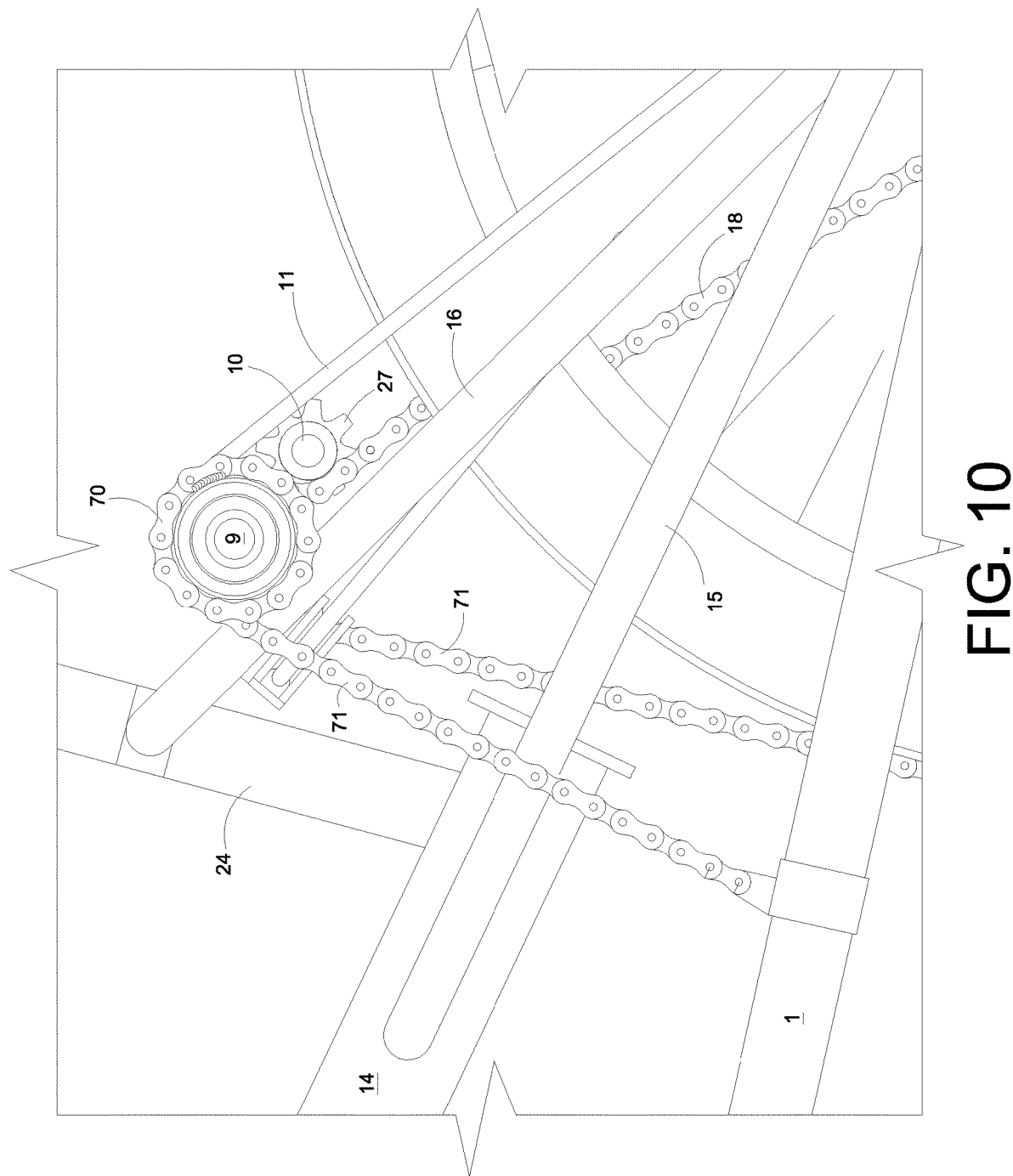

FIG. 10 is a zoomed in version of FIG. 9

Figures 11, 27:
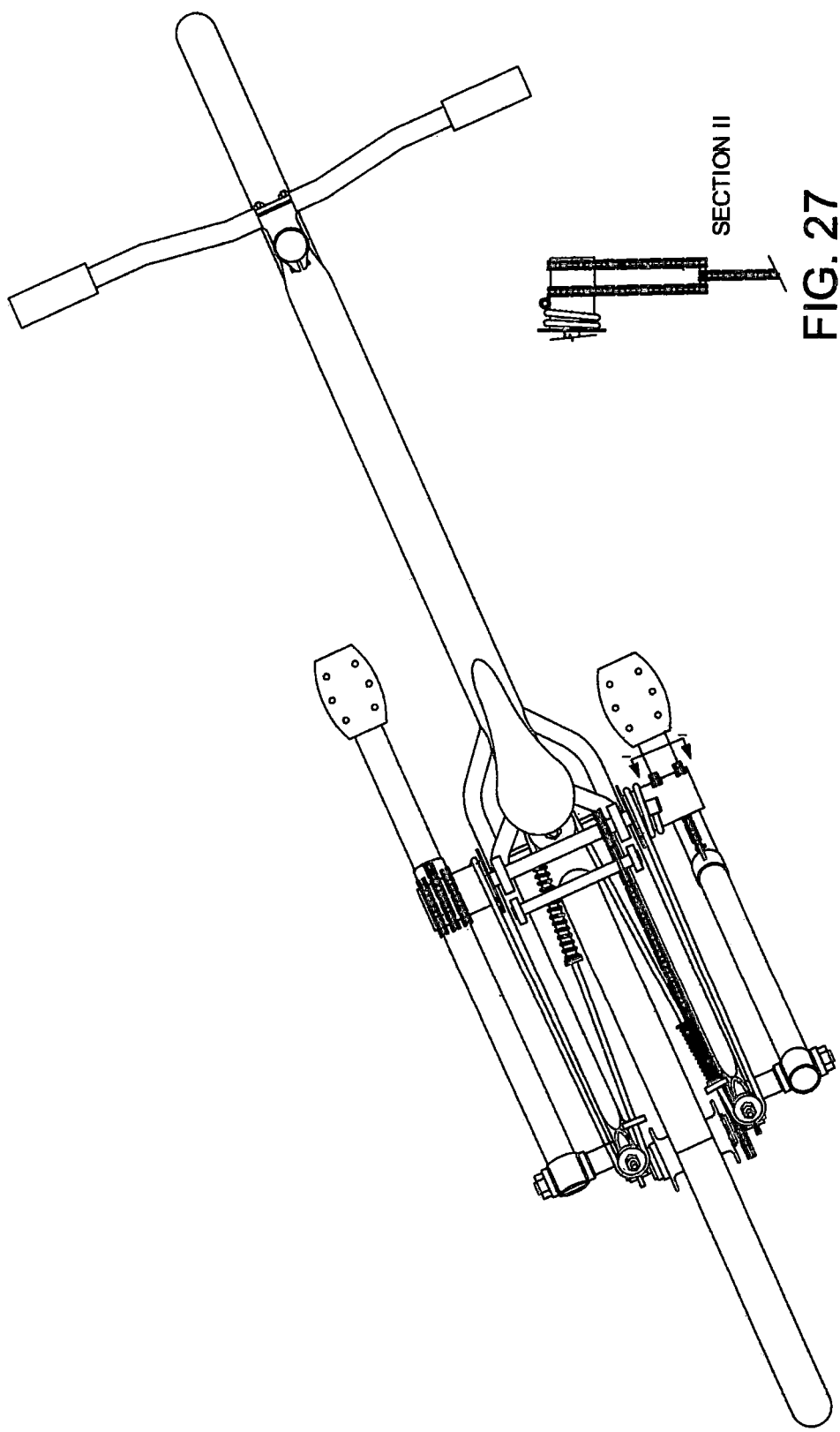

FIG. 11 is a bird's eye view of the chain/steel cable variant. On the right side the top two duplicate chain 70 are seen welded on the top surface of its member cylinder 33. The single chain 50 is centrally aligned to its member tube 2. On the right cylinder 33 from the smaller cylinder 43, the reciprocal cable starts from this small cylinder 43 rearward and coils around its member cylinder 33 at lease two times then proceed forward in the groove of its member pulley wheel 48, then around it, forwardly to the central pulley wheel 61, then back toward left pulley wheel 45 within its grooves, around it, then forwardly to the left member drive cylinder 33 over it and is sealed below it within a smaller cylinder 43 welded beneath it. The left side shows how the single chain 51 is partially wrapped around its member cylinder 33 about 180 degrees while its duplicate parallel member chains 70 linked to it wraps around the same cylinder 33 360 degrees.

Figure 12:
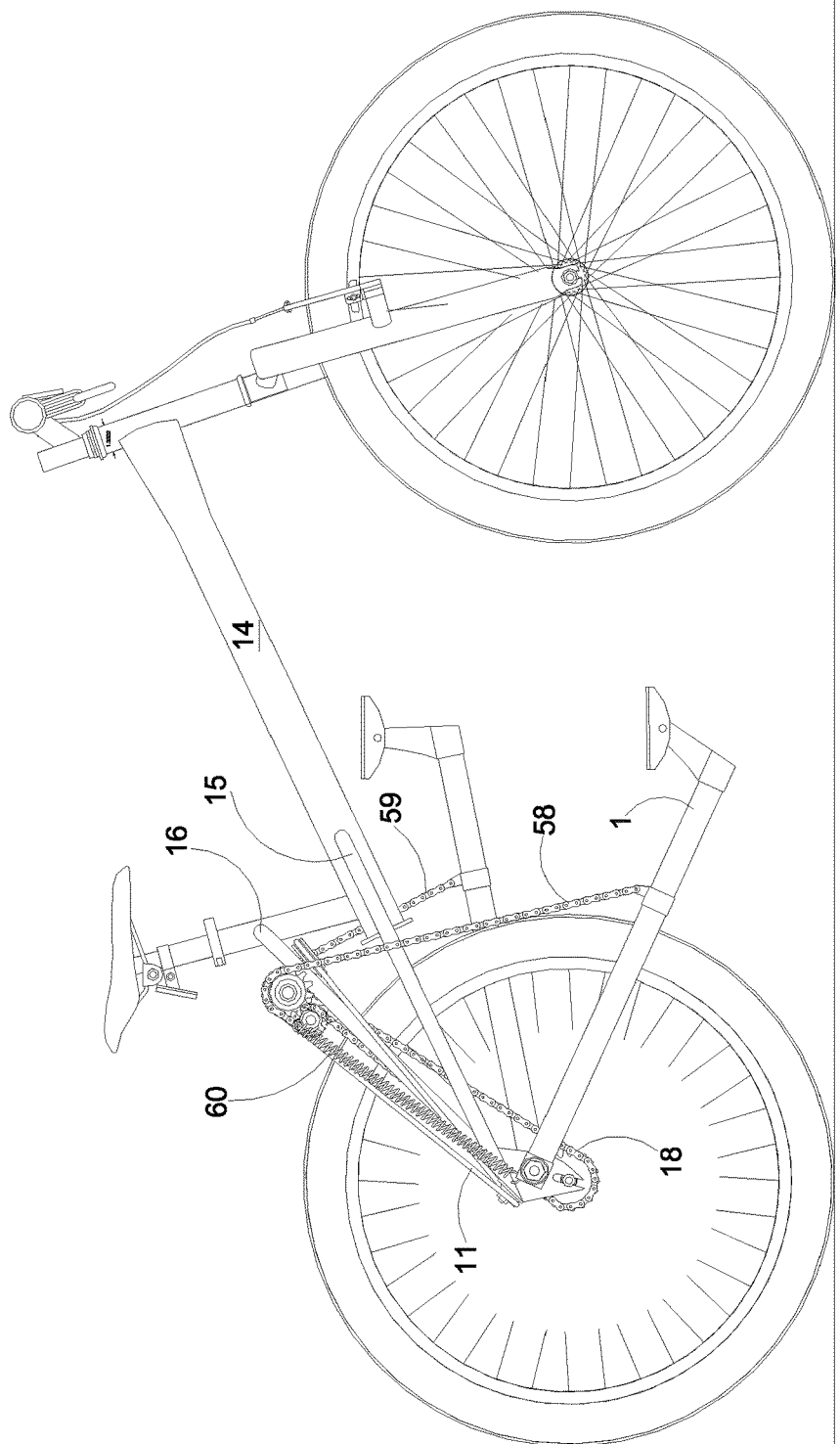

FIG. 12 shows a right-side view of a chain spring variant, wherein the spring is connect to the upper end of the right chain 58 and connected oppositely to the rear edge of its member lever machine through a hole. This member chain 58 so that the chain 58 don't slip when a rider pedals the bicycle. When this lever machine is reciprocated upward, this spring 60 will pull its member chain 58 backwards while its member axle 9 rotates forwards.

Figure 13:
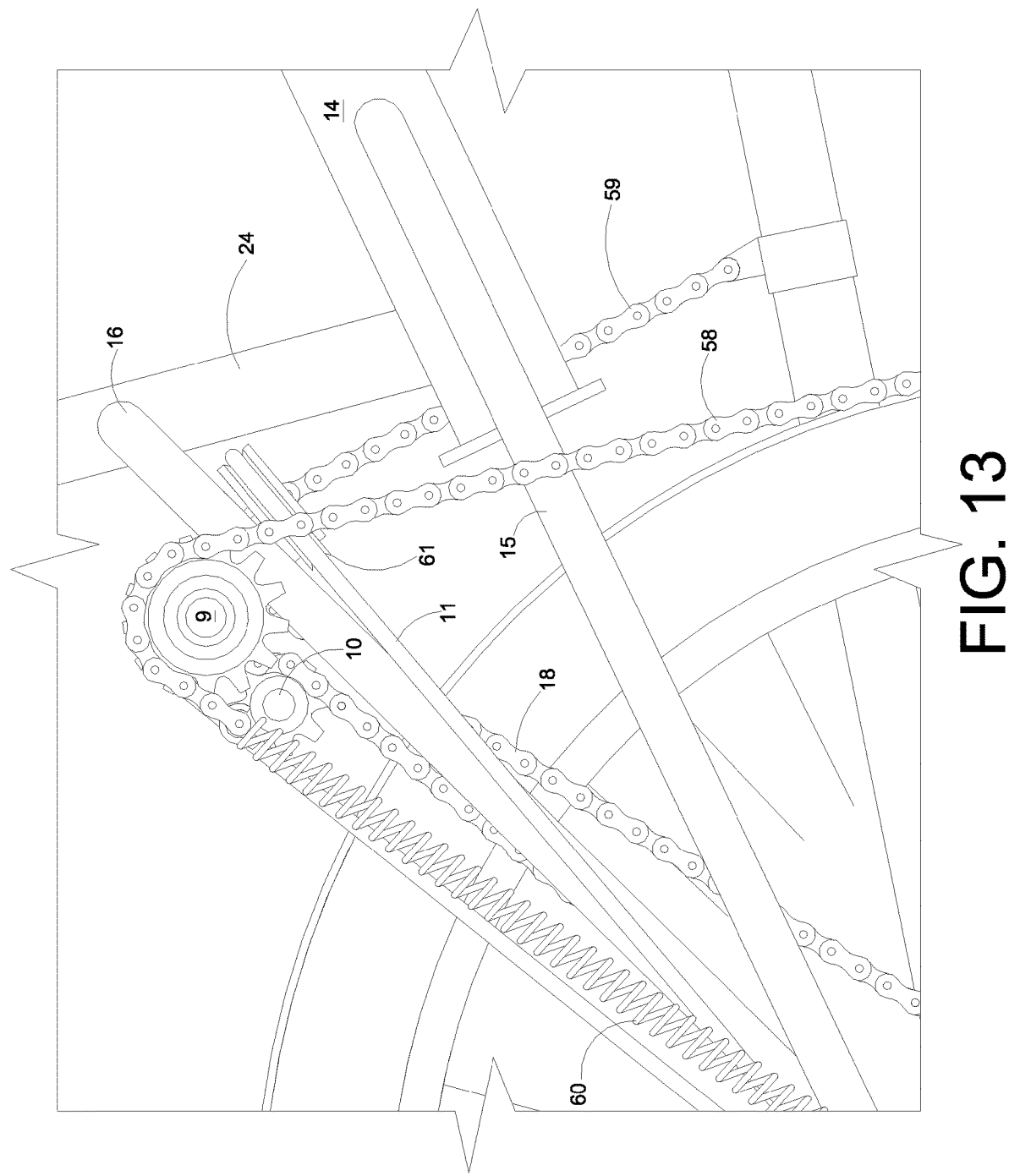

FIG. 13 is a zoomed in version of FIG. 12.

Figure 14:
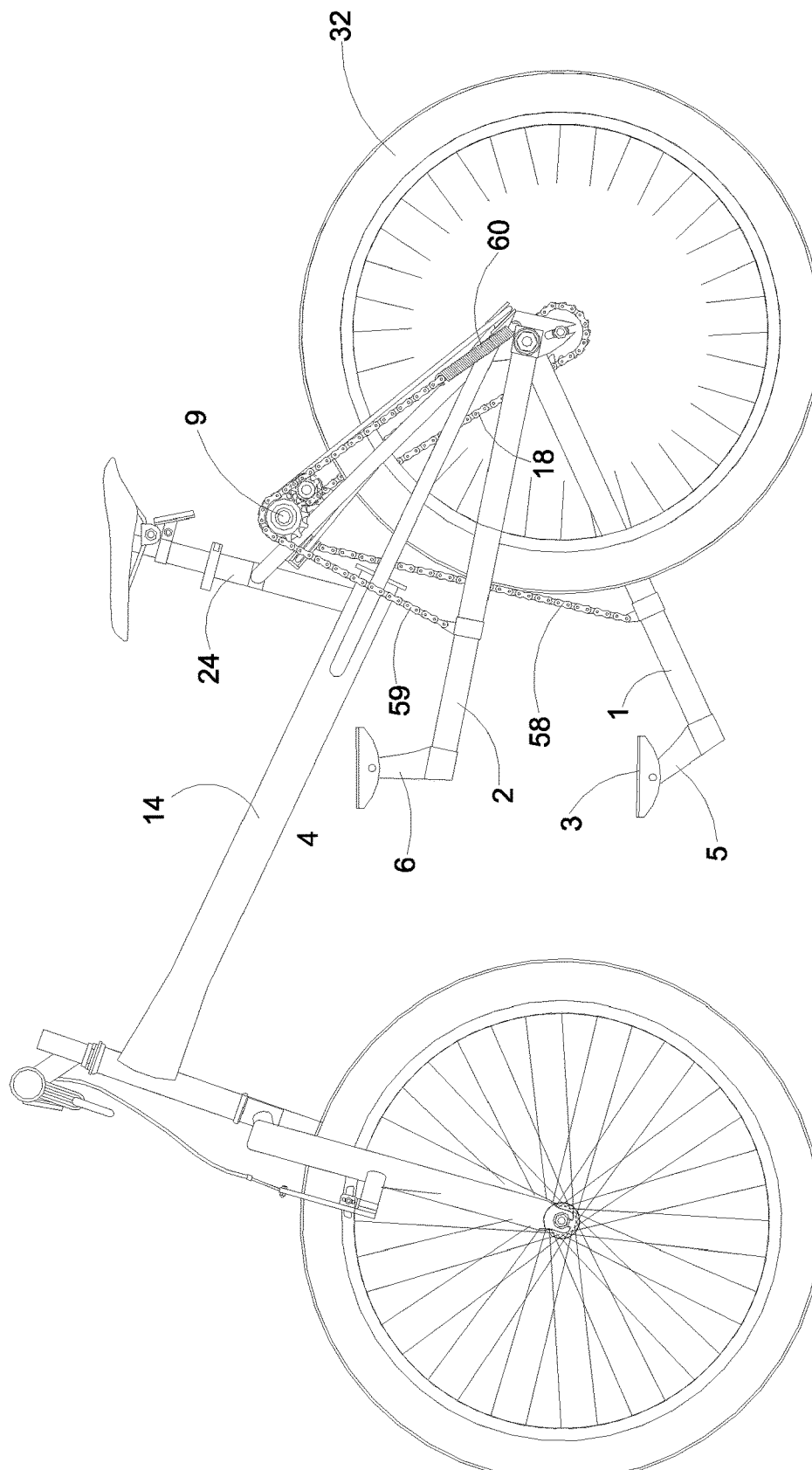

FIG. 14 shows the left side of the chain/spring variant and how the bicycle looks when the left spring 60 completely pulls back its member chain 59 to be pulled down again by its member lever machine 2 to rotate its member sprocket 28. This rotation would turn the dive axle 9 and rotate the 8-tooth sprocket 41, which would transfer rotation power to the rear wheel 32 and move the bicycle forward.

Figure 15:
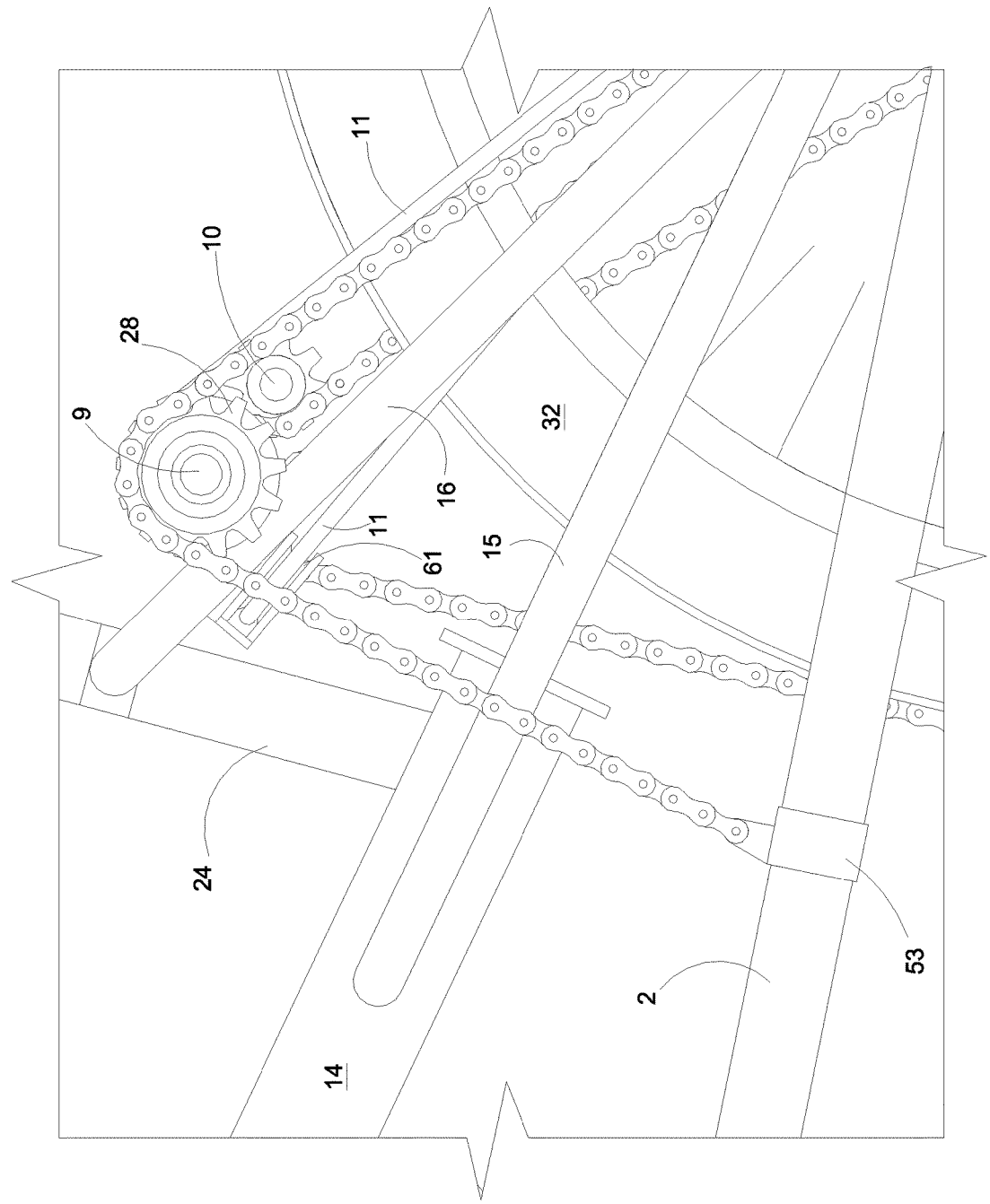

FIG. 15 is a zoomed in version of FIG. 14.

Figure 16:
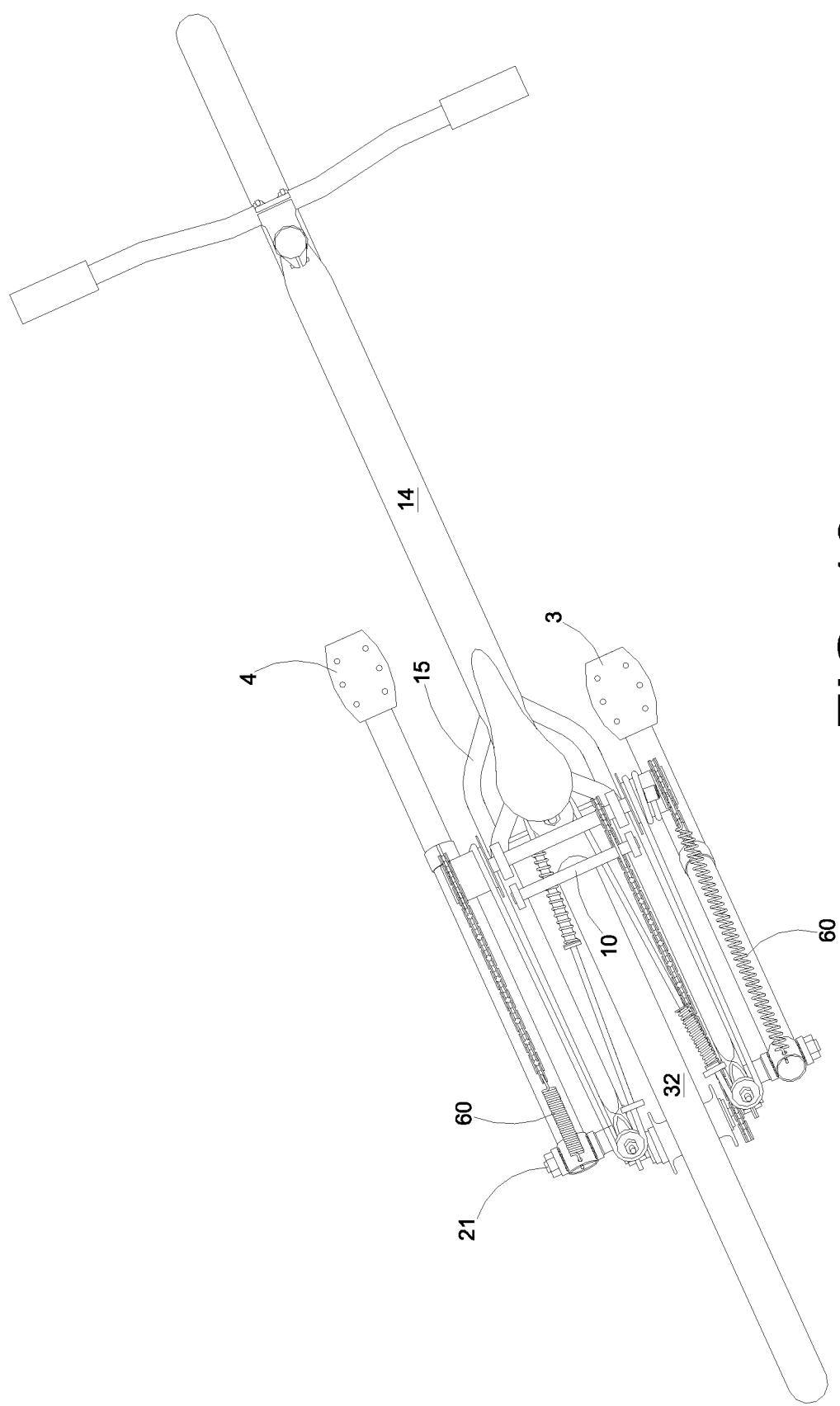

FIG. 16 is a bird's eye view of the chain/spring and cable variant. Notice how the right spring 60 is stretched and the left spring 60 is contracted. Both chains 59 and 58 are centrally aligned to their member lever machines (1 and 2). Both 13 tooth freewheel sprockets 28 are centrally aligned to their member lever machines, 1 and 2. Each rear pulley wheel 48 connected to a metal plate which is welded to the end bottom fork 15 of the bicycles frame 14.

Figure 17:
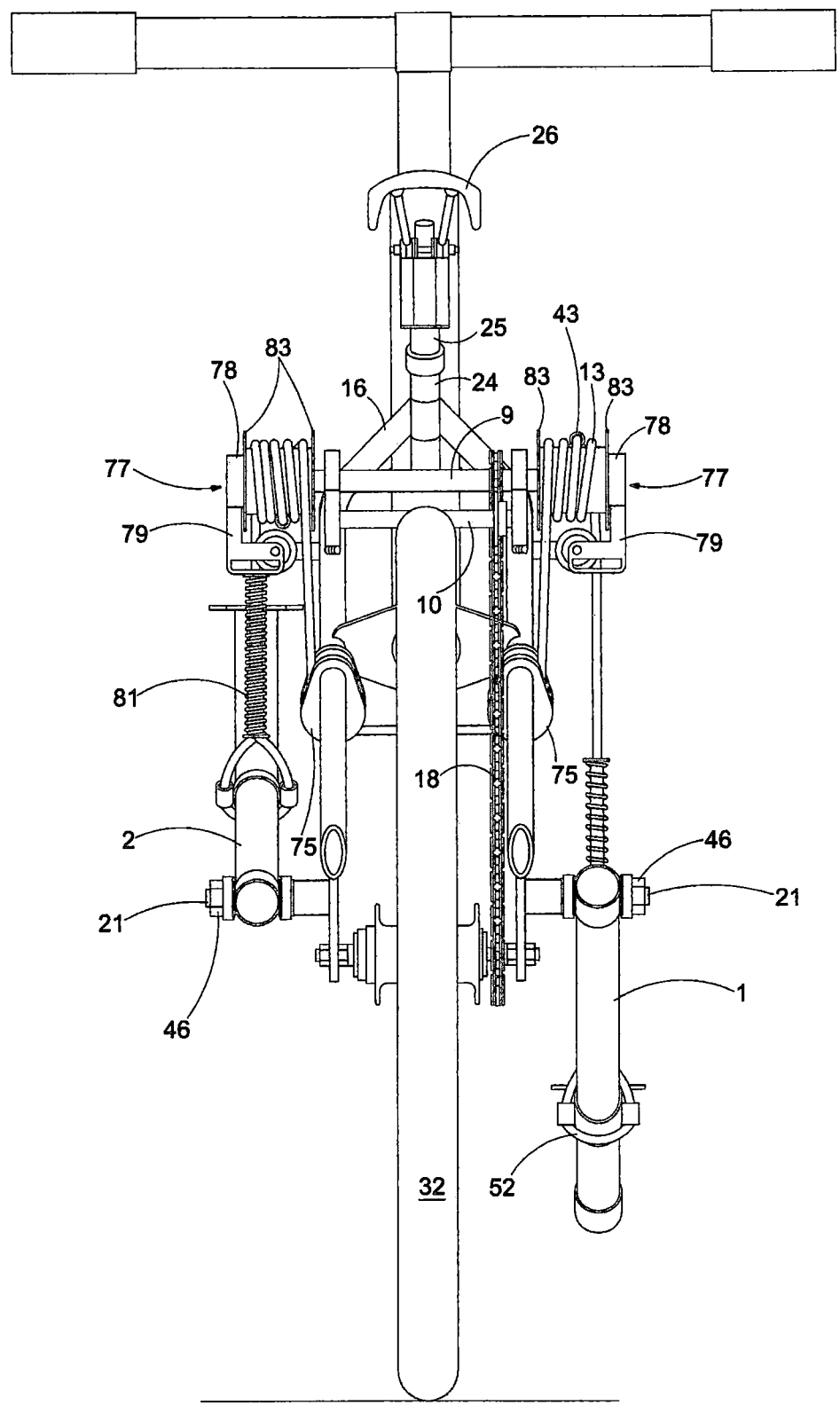

FIG. 17 shows a rear side view of the spiral steel cable drive variant. Connected to each lever machine 1 and 2 are two ring cylinders welded to the chromoly rear portion of the lever machine that house a bearing. Occupying these bearings opposite sides of its member lever is the axle 21 functioning as the fulcrum. Each axle is 21 is mechanically fastened to the dropout plate 72 in which a hole was drilled through the dropout plate, and then threads were tapped in it. The axle 21, which is a bolt, is then screwed in the tapped bore. Then a resin is poured into each cylinder (44 & 45) welded to a member dropout plate 72 to hold the axle 21 and rigidly suspend it centrally within a member cylinder (44 & 45).

Figure 18:
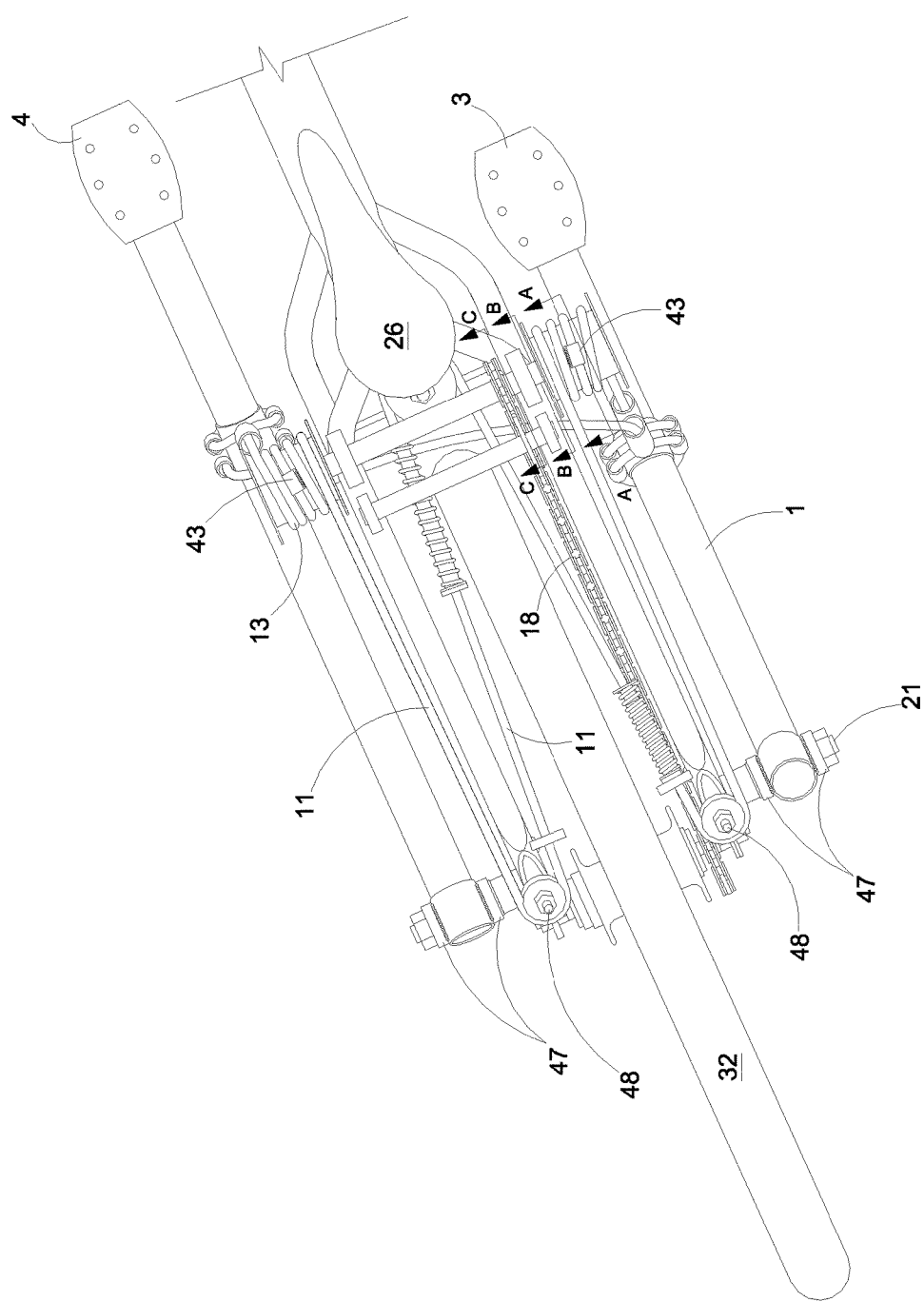

FIG. 18 shows a zoomed in version of FIG. 16.

Figure 19:
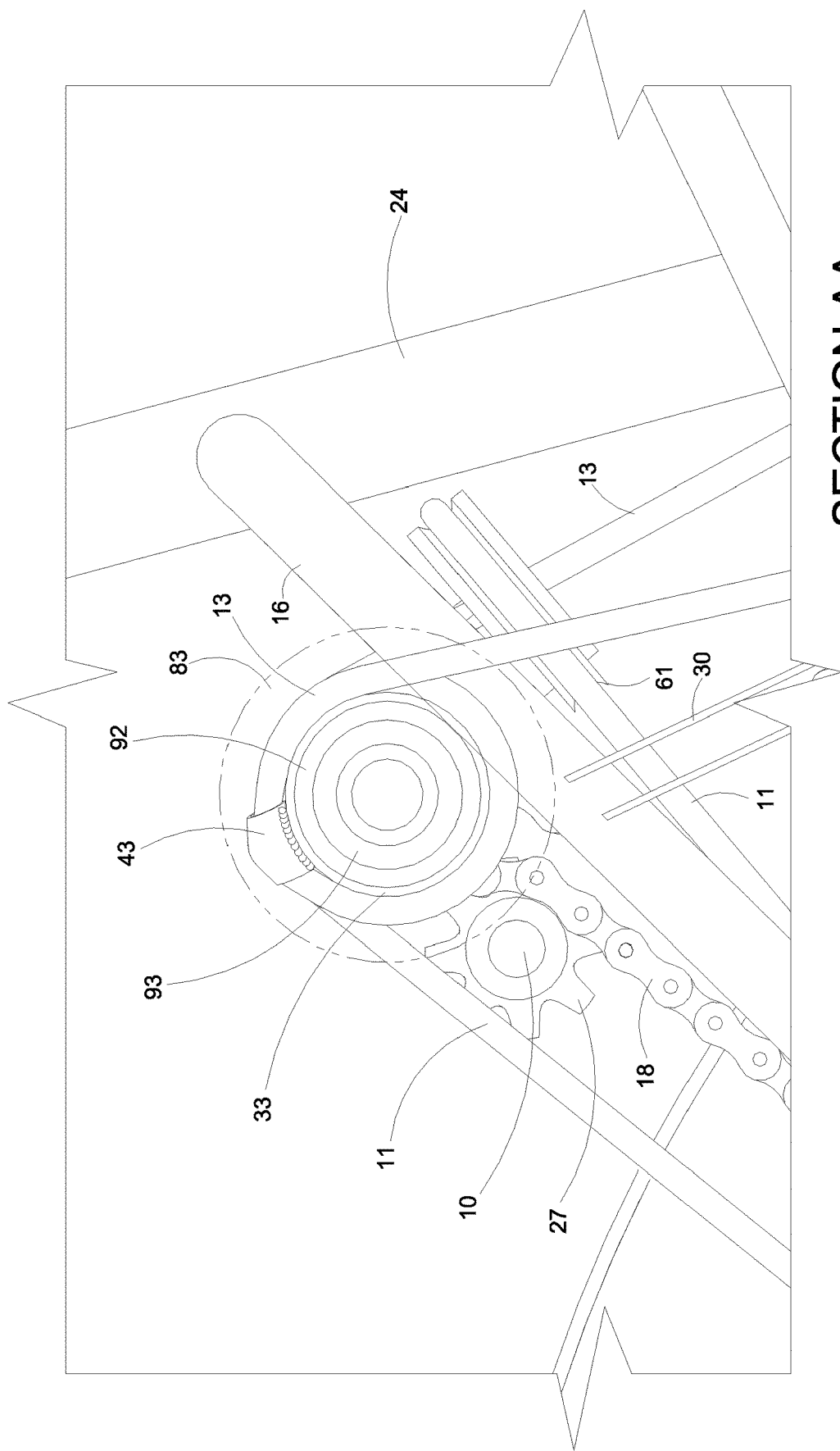

FIG. 19 is a sectional view AA of the spiral steel cable drive variant. It shows how the bearing around the drive axle 9 suspends the drive cylinder 33 centrally around the drive axle 9 and how the aluminum space 13 is glued around the bearing 74.

Figure 20:
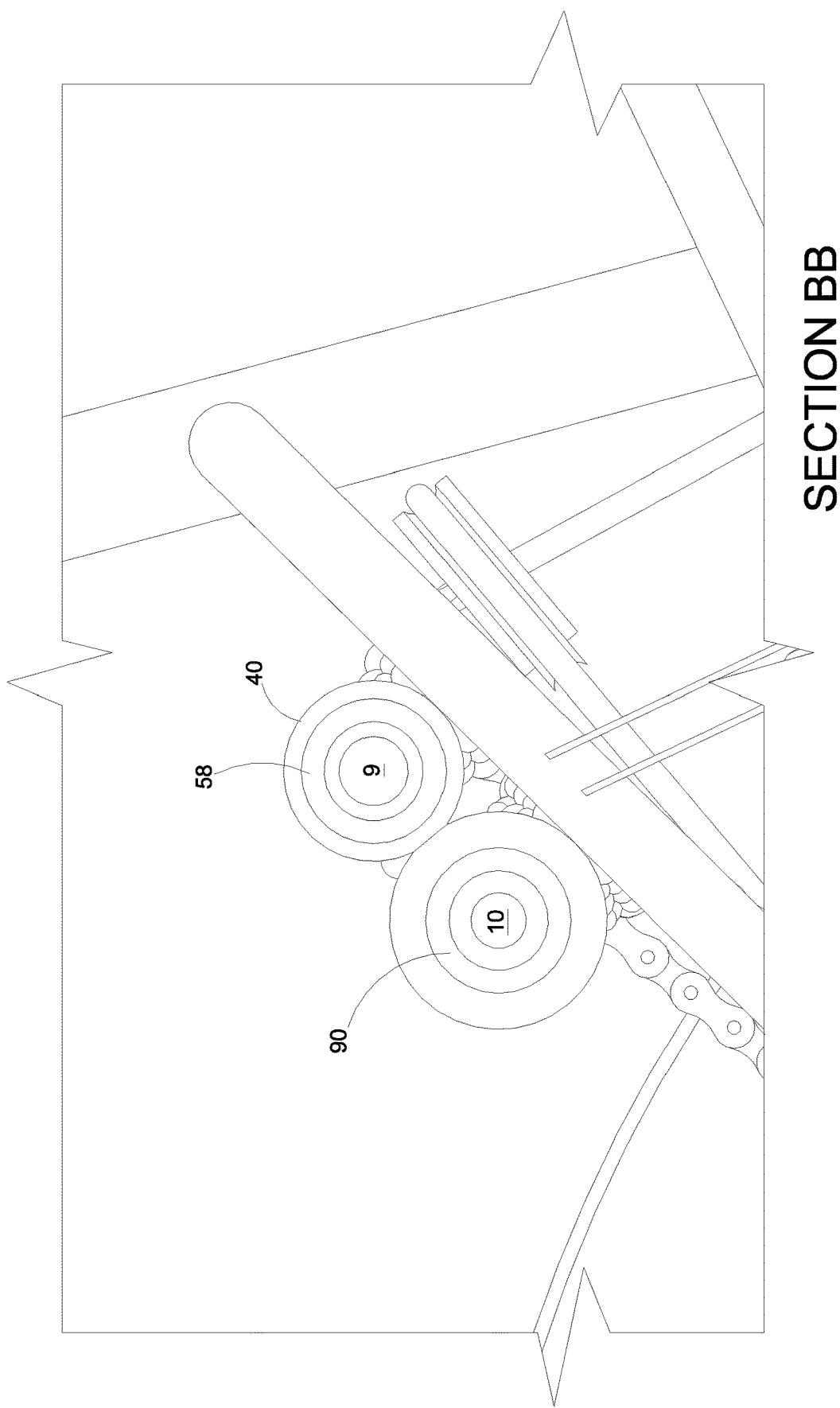

FIG. 20 section BB which shows how the metal ring holds the bearing in place on the upper frame 14 of the bicycle and how it is welded to the upper fork 16 of the bicycle.

Figure 21:
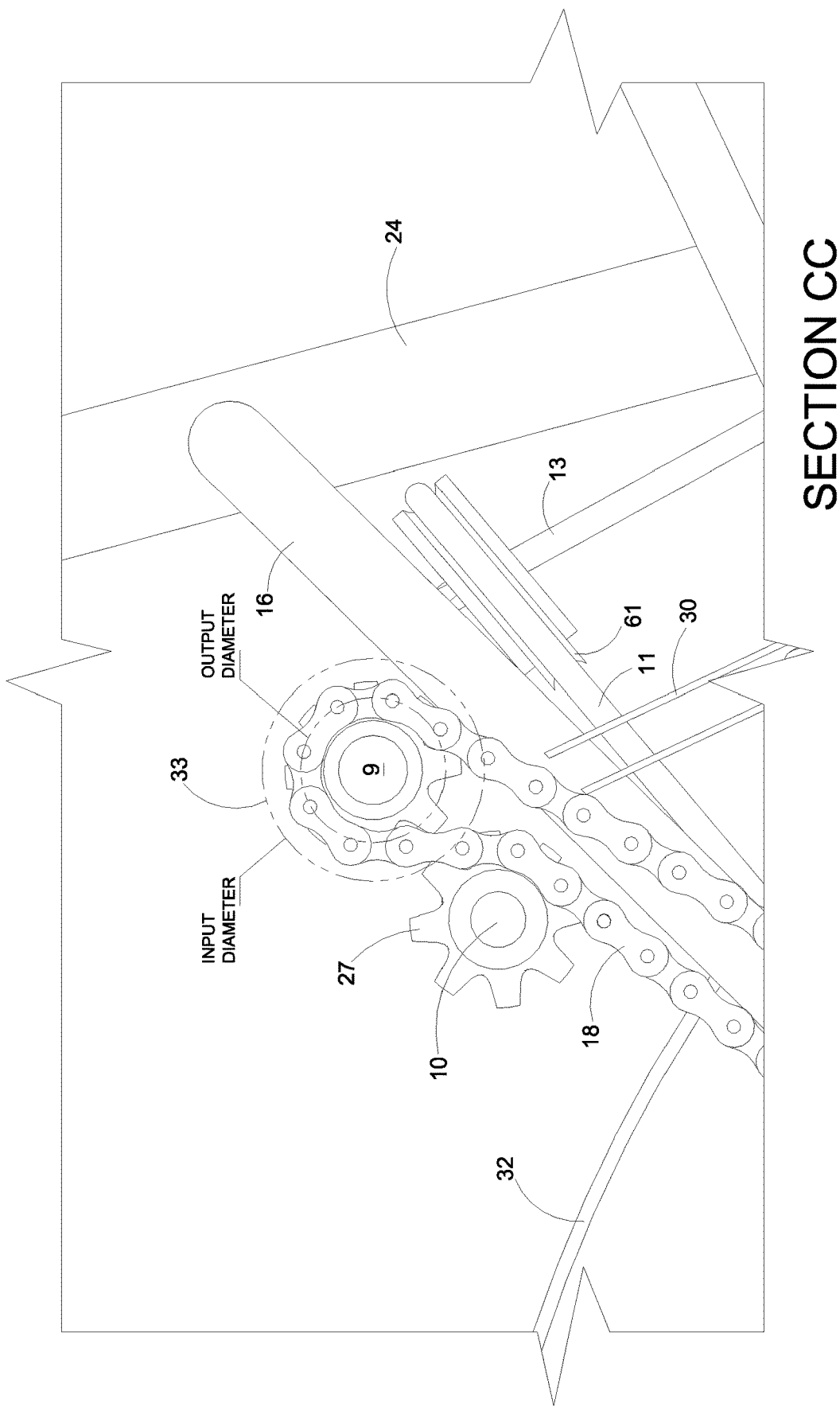

FIG. 21 is section CC and shows the output crank sprocket 41, which is welded to the crank axle having an O.D. of 0.626 inches. Adjacent to it is an anti-slip sprocket slightly below it which is designed to route the drive roller chain 18 to hug and engage more sprocket teeth so as to prevent the chain 18 from slipping under high torque loads.

Figure 22:
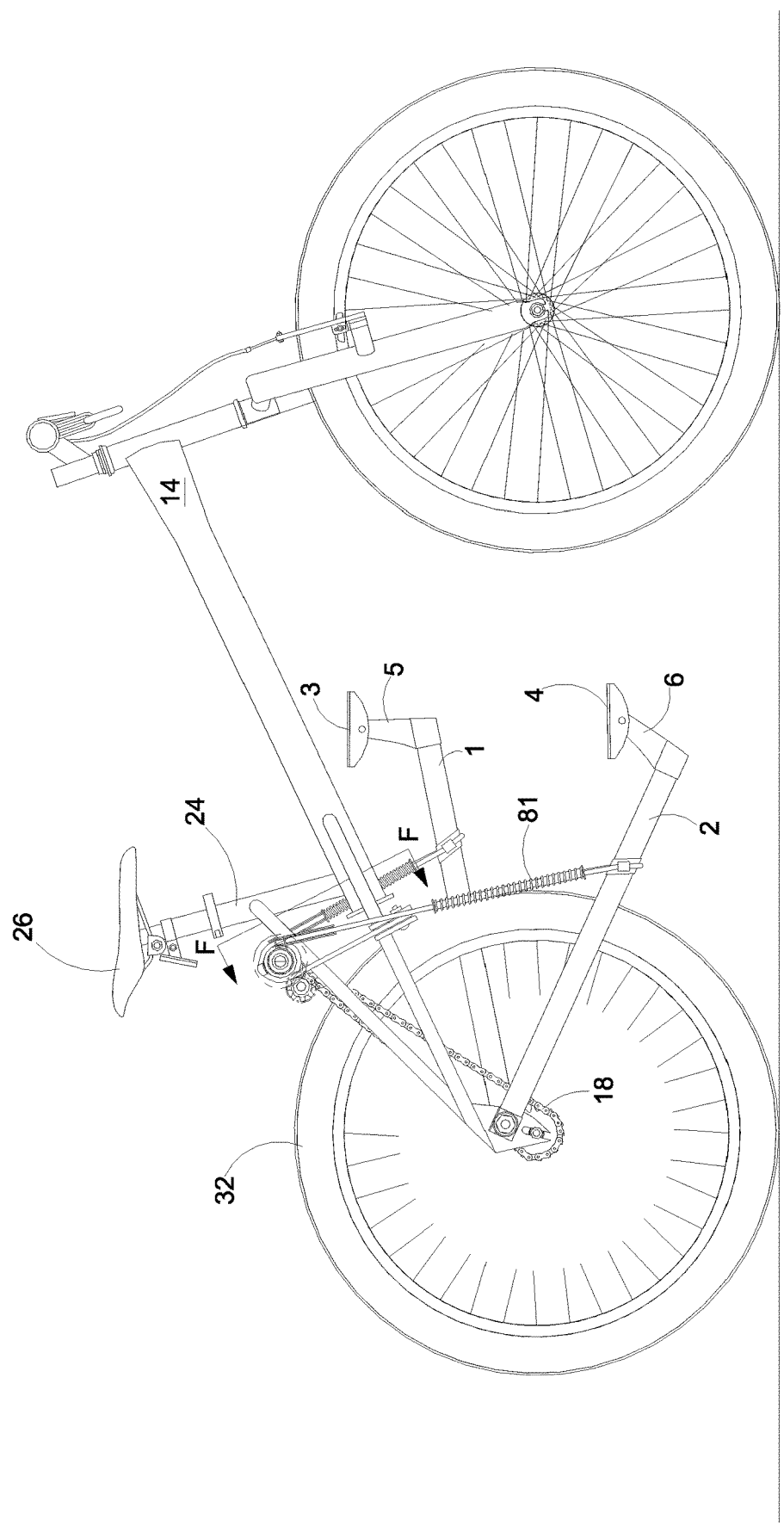

FIG. 22 shows a spiral cable drive variant slightly different than the spiral cable drive variant of FIG. 1. This variant omits the reciprocal cable going back towards pulley wheel 48 in the rear of the bicycle and it is now routed to a pulley wheel fastened under the lower fork 15 of the bicycle's rear frame. Two carbon fiber plates 75 houses a pulley wheel 76 and allow the reciprocal portion of the cable 11 to go through the outer and bottom surface of each pulley wheels 76 grooves. So the steel cable goes down from its drive cylinder 33 into the grooves of its member pulley wheel 76. Then to the left into the bottom groove of its adjacent pulley wheel 76 and curves up with this groove around its member drive cylinder 33 to be chemically fastened into its member welded cylinder 43. This design may be preferred because less steel cable is used to reciprocate each lever machine and the central pulley wheel 61 is not needed which would result in a reduction of weight of the bicycle.

Figure 23:
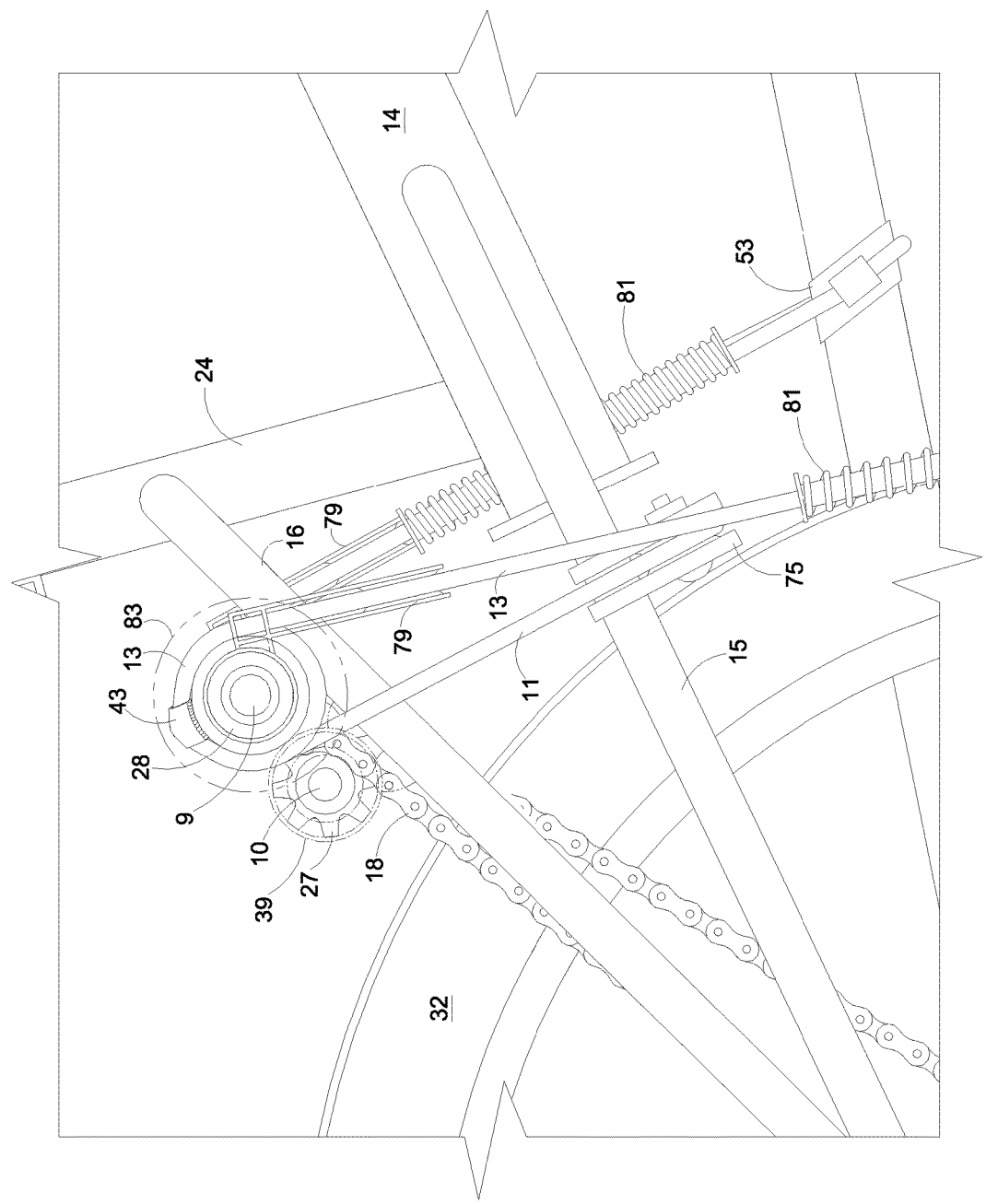

FIG. 23 shows a zoomed in version of FIG. 22.

Figure 24:
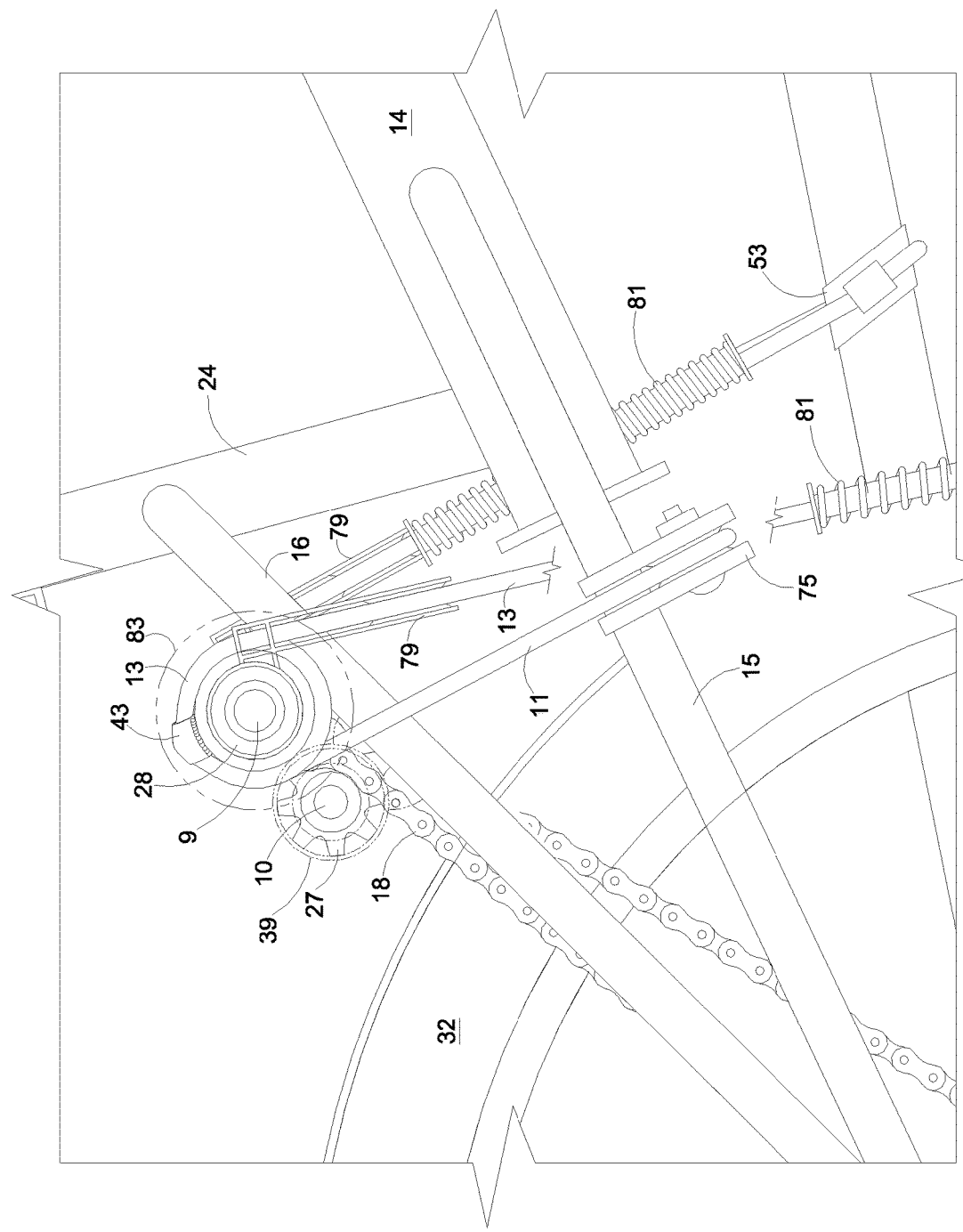

FIG. 24 reveals how the reciprocal cable 11 is routed underneath the lower fork 15 of the rear frame in order to reduce the weight of the bicycle.

Figure 25:
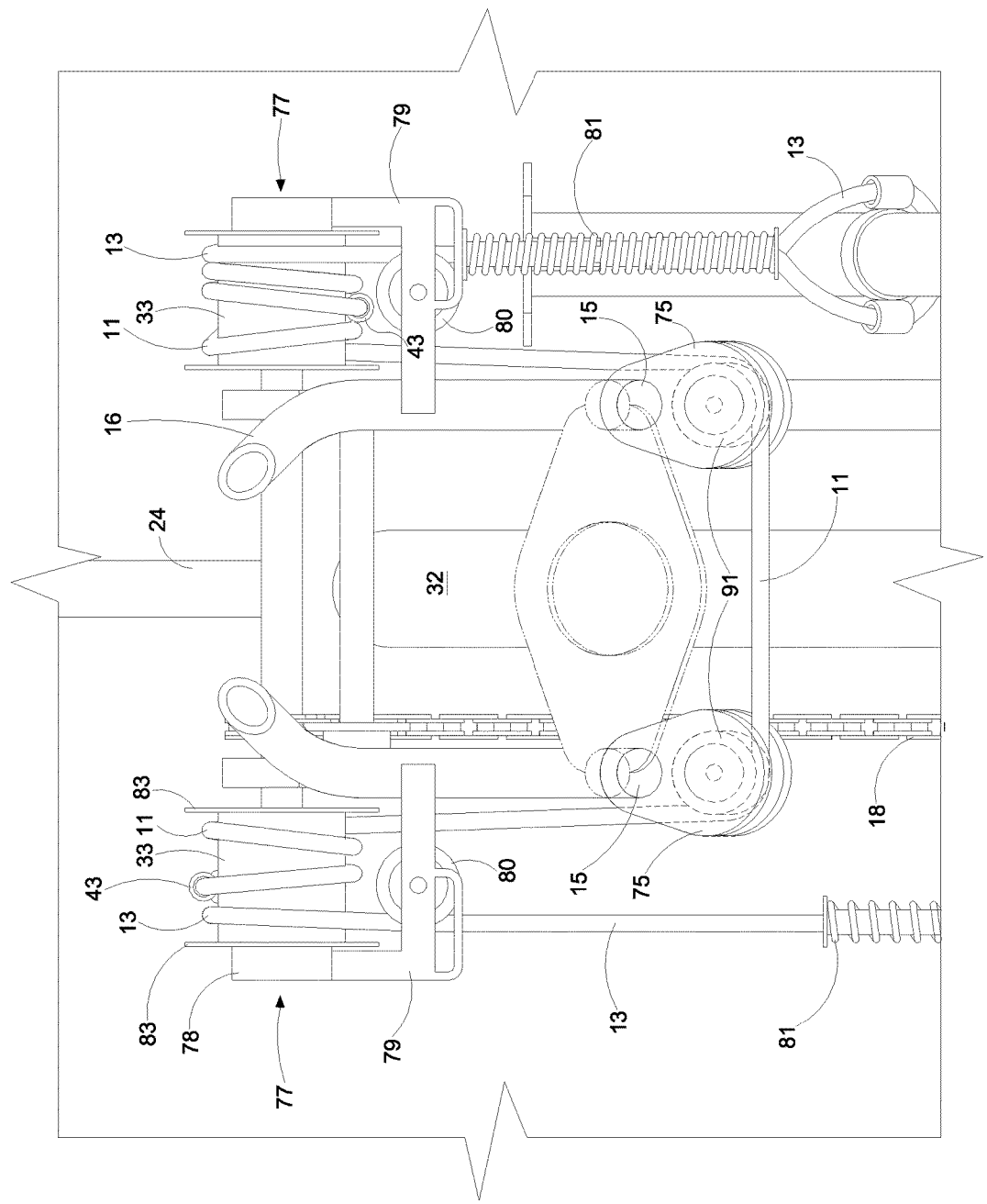

FIG. 25 illustrates a section FF of the spiral cable drive variant and reveals how the carbon fiber plates 75 is positioned around the lower tubes 15 of the rear frame. Each radial drive cylinder rotates on the same axle 9. On the outer ends of this axle are bearings 77 within chromoly rings 78. Each chromoly ring 78 is held in place around their member bearing 77 with a 3M DP 420 resin. A member L-shaped are 79 is welded to their member chromoly ring 78 and these have parallel bars that house a member pulley wheel 80. This pulley wheel keeps its member drive steel cable 13 at 90 degrees to the drive axle 9 of the drive cylinders 33 and on center of its member lever machine 1 & 2 to prevent each lever machine from wobbling out of place due to the horizontal displacement of each drive cable as it unreels off of its member drive cylinder 33, while its member lever machine pulls on it. Notice the left side cable drive system is at a slant. This is due to the unreeling of the steel cable, thus the pulley wheel 80 keeps this cable upright at 90 degrees. One of the parallel horizontal bars stops at the hidden line while another portion of the bar is extended inwardly to collide with the bottom surface of the upper fork 16 of the bicycle's frame. This collision prevents the L-shape housing of the pulley wheel 80 from pivoting upward or too high for the spring 81 to absorb the impact when its member lever machine 1 is pedaled upward. Without it the pulley wheel casing hitting the fork 16, the impact from the spring 81 would cause the pulley wheel 80 to pivot upward and around the drive axle 9.

FIG. 26 reveals a cut away section HH of the sliding tube assembly within the shock absorbent spring 38. The spring is 35, the outer tube is 36, the inner stationary tube glued to the steel cable is 37, the resin that holds this cable in place is 38 and the steel reciprocal cable is 11.

FIG. 27 shows the unraveled assembly of the paired offset chains 56 and single chain 50 and how they are connected to the cylinder drive member 33.

Operation—FIGS. 1, 5, 6, 7, 12, 21

When a rider pedals the Compound Torque Multiplying Lever Propelled bicycle a number of things would happen based on the design of the apparatus. Firstly, in FIG. 1 when a rider pedal this spiral steel cable variant bicycle, the steel cable 13 will pull from the frontal surface of the drive cylinder 33 and rotate the entire cylinder along with the remainder of the cable 11 coiled around the drive cylinder 33. Most of the pulling pressure on this device would be the point where the steel cable 13 is glued to the slanted cylinder 43 welded to its member drive cylinder 33. Thus, the steel cable 13 would pull the slanted cylinder 43 and rotate the reciprocal portion of the steel cable 11. This reciprocal portion of the steel cable 11 would then be wrapped around it member drive cylinder 33 while pulling along it route directed by pulley wheels 48 and 61. The pulley wheels 48 routes the cable 11 towards the rear of the frame, then towards the middle of the frame and around the central pulley wheel 61, then back toward the rear of the frame and then toward the left side of the frame and then to the upper surface of the drive cylinder 33. So when the right side of the pedal is pushed downward, this pull on the cable 11 causes the left side drive cylinder 33 to rotate backwards while the right side cylinder rotates 33 forward. The backwards pull of the reciprocal cable 11 causes the left side drive cylinder 33 to rotate and reel upwards the load portion of the steel cable which causes its member lever machine 2 to be pulled up by this cable to its highest peak so the pedal 4 mounted it can be pushed down with the left foot for forward propulsion. Other reactions take place when the right pedal is pushed to its base level. The right compression spring 35 is compressed to abort the shock and stop the downward movement of the right pedal 3. This spring also returns upward energy back to the foot when the riders legs lifts up from the right pedal 3. The same reaction happens on the left side of the bicycle when the left foot pushes down on the left pedal 4 and propels the bicycle forward. Furthermore, the crank sprocket on the right side of the rear wheel elevate above the rear wheel would be turned with a force greater than the output of the lever machine pulling on it and sprocket combination combined. This is because the smaller 8 tooth sprocket 41 pitch diameter is closer to the axle than its adjacent input sprocket, which is a 13 tooth sprockets. So like a small lever machine, the output by itself would yield 1.59907696, while the lever machine pulling this sprocket combination forward would yield 1.53959323. However, in order to get the end result output torque of the 8 tooth sprocket on the drive chain 18, one would have to multiply the torque output of the 8 tooth sprocket times thestorque output.

OPERATION—FIGS. 1, 5, 6, 7, 12, 21

When a rider pedals the Compound Torque Multiplying Lever Propelled bicycle a number of things would happen based on the design of the apparatus. Firstly, in FIG. 1 when a rider pedals this spiral steel cable variant bicycle, the steel cable 13 will pull from the frontal surface of the drive cylinder 33 and rotate the entire cylinder along with the remainder of the cable 11 coiled around the drive cylinder 33. Most of the pulling pressure on this device would be the point where the steel cable 13 is glued to the slanted cylinder 43 welded to its member drive cylinder 33. Thus, the steel cable 13 would pull the slanted cylinder 43 and rotate the reciprocal portion of the steel cable 11. This reciprocal portion of the steel cable 11 would then be wrapped around its member drive cylinder 33 while pulling along its route directed by pulley wheels 48 and 61. The pulley wheels 48 routes the cable 11 towards the rear of the frame, then towards the middle of the frame and around the central pulley wheel 61, then back toward the rear of the frame and then toward the left side of the frame and then to the upper surface of the drive cylinder 33. So, when the right side of the pedal is pushed downward, this pulls on the cable 11 causes the left side drive cylinder 33 to rotate backwards while the right side cylinder rotates 33 forward. The backwards pull of the reciprocal cable 11 causes the left side drive cylinder 33 to rotate and reel upwards the load portion of the steel cable which causes its member lever machine 2 to be pulled up by this cable to its highest peak so the pedal 4 mounted it can be pushed down with the left foot for forward propulsion. Other reactions take place when the right pedal is pushed to its base level. The right compression spring 35 is compressed to abort the shock and stop the downward movement of the right pedal 3. This spring also returns upward energy back to the foot when the riders legs lift lifts up from the right pedal 3. The same reaction happens on the left side of the bicycle when the left foot pushes down on the left pedal 4 and propels the bicycle forward. Furthermore, the crank sprocket on the right side of the rear wheel elevated above the rear wheel would be turned with a force greater than the output of the lever machine pulling on it and sprocket combination combined. This is because the smaller 8 tooth sprocket 41 pitch diameter is closer to the axle than its adjacent input sprocket, which is a 13-tooth sprocket. So, like a small lever machine, the output by itself would yield 1.59907696, while the lever machine pulling this sprocket combination forward would yield 1.53959323. However, in order to get the end result output torque of the 8-tooth sprocket on the drive chain 18, one would have to multiply the torque output of the 8-tooth sprocket times the torque output of the lever machine to get the total torque output of 2.46180958. One of the amazing results of this propulsion system is that its torque output would be almost consistent on the rear wheel from pedal peak to pedal base, because the curved path that the pedal travels in when it is being pushed down is almost linear (straight) and aligned with the pull of gravity. So, the bicycle should be propelled forward with a significant amount of force and a substantial amount of range. This range would be accomplished, due to the design configuration of using a small drive sprocket of 13 teeth 28, which would allow it to go through an approximate 540 degree turn because the circumference of the sprockets pitch diameter is approximately 1 and a half smaller than the distance of the load being pulled from pedal peak to pedal base.

FIG. 7 has the chain/steel cable combination which allows two parallel chain links 70 welded to the top surface of the its member drive cylinder 33 to be pulled down by the pull of the single chain 71 coupled between the lower end of the parallel chain links 70 with pivotal ability. So, when this chain assembly is pulled, the horizontal permanent position of the two upper chain links 70 allows the single chain 71 to hang in a perfect 90-degree angle from its associated drive shaft 9. Each chain assembly would prevent its connected lever machine (1 or 2) member from wobbling out of alignment with center of the dual upper chain 70 position. Furthermore, when this chain assembly is rotated backwards due to the downward pedaling of its adjacent lever machine, the upper dual chain assembly 70 would wrap around its connected drive cylinder 33 and stop with a gap between the upper chain link and lower chain link of the paired chains 70, while the single chain 71 between them would continue to wrap around the drive cylinder 33 between the dual chain links 70 about 180 degrees after the 360 degree wrapping of the dual chain links 70 around its member drive cylinder 33. This variation would allow reeling and the forward pull reciprocation of this chain assembly without conflict. Thus, the same reaction would occur as in the spiral cable drive design, concerning all the other components.

FIG. 12 has a chain/steel cable combination which would allow the single chain 58 connected to a curved triangular steel piece 54 that is welded to a cylinder 52 around the tube 1 of its member lever machine to be pulled by this lever machine 1. The cylinders 52 and 53 would be held in place by a 3M DP 420 resin. As a lever machine is being pedaled downward, the single chain 58 would engage its member sprocket 28 at the pitch diameter and rotate forward this freewheel sprocket 28 along with its connected drive shaft 9. The spring 60 connected at the opposite end of the chain 58 would cause the chain 58 to stay tight around its member drive sprocket 28 and then pull this end of the chain 58 backwards toward the rear of the frame 14 while rotating its member drive sprocket 28 backwards for forward propulsion. The same mechanical reaction would happen to the adjacent chain/spring assembly on the other side of the bicycle. Furthermore, the same mechanical reaction would happen for the all the other components describe for spiral steel cable variant.

FIG. 21 has a design that is the same as the spiral steel cable variant, but its reciprocal cable 11 does not go rearward, but downward under the tube of the bicycle's lower forks 15. Furthermore, the compression spring are not between the rear forks of the bicycle, but around the drive portion of the steel cable 13 and one is assembled between each lever machine (1 & 2) and member drive cylinder 33. So, when a rider pushes a pedal 3 down the reciprocal portion 11 of the cable move through two pulley wheels that are fastened between two carbon fiber plates 75. So, when the drive portion of the steel cable move down the reciprocal portion of the steel cable move outwards then up and vice versa for the other side. The compression spring positioned around the drive cable 13 and is held in place by a stationary cylinder 36 (FIG. 26) glued to the reciprocal cable 11. A washer like ring welded to this cylinder's 36 lower edge keeps the spring from falling down. Another movable cylinder 35 that is able to move up and down around cylinder 36 and has a washer like ring welded to its upper edge and it down facing surface rest on this spring. Thus, there is gap between this upper ring and upper edge of the inner stationary cylinder 36. This gap allows there to be room for compression of the spring 81 when the upper surface of the washer like ring collides with the L-shaped arm of the pulley wheel casing 79. The upper surface of the washer like ring is coated with a layer of silicon rubber to dampen the noise of the collision. The same assembly is the same for the reciprocal and cable drive component on the other side of the bicycle.

So when a rider pedals the bicycle the drive cable rotates forwards it drive cylinder 33 and reels up it member reciprocal cable 11. The upward movement of this reciprocal cable is rerouted horizontally by the pulley wheel that is sandwiched between the plates 75. The plates are made of carbon fiber and glued to the lower tube 15 of the bicycle's forks. The cable is kept from slipping out of these plates by rectangular pieces on the outer and lower curve of the dual plate. This material is not limited to carbon fiber, but could be titanium, aluminum, steel or chromoly. So as the rider pushes down on the pedal the other side the bicycle's reciprocal cable is pulled downward, while rotating the drive cylinder above it backwards. This backwards reeling, reels up the drive portion of the steel cable 13 around the drive cylinder 33 while pulling up its member lever machine 2 for forward pedaling propulsion. As the lever machine approaches its member drive cylinder 33, the L-shaped arm of the drive assembly collides with the upper washer ring of its member spring assembly 81. When this collision takes place the L-shaped arm pivots up slightly and its horizontal portion pivots into the lower curve of the lower fork 15 to keep this L-shaped assemble from rotating around the drive cylinder 33. Thus, a similar reaction would happen to opposite side the bicycles reciprocal components when this pedal is pushed to its lowest position. In FIG. 19 SECTION AA the illustration reveals the aluminum spacer 92 that allows the drive cylinder 33 to bear weight on the bearing 93 that is glued to the aluminum spacer 92, and the aluminum spacer 92 is which is glued to the drive cylinder 33. This assembly eliminates friction at the end of the cylinder 33 that is close the upper fork portion 16 opposite the freewheel sprocket 28 glued within the drive cylinder 33. At opposite ends of each drive cylinder 33 is a ring like washer 83 welded to each edge designed to keep the drive side 13 of the cable and reciprocal side of the cable 11 from slipping off of the drive cylinder 33. The drive and reciprocal cable are one continuous cable that begins looped around lever machine and ends looped around a lever machine. In FIG. 20 there is a bearing 58 that accommodates the drive shaft 9 and reduces friction on this shaft as its turns. Also, there is another bearing 90 that accommodate the shaft 10 for the anti-slip sprocket 27 as it turns.

The invention claimed is:

1. A lever propelled bicycle comprising:
a cable that is connected to a right member lever machine as a load, that leads upwards to further wrap around a right radial drive member from front to back, while right member lever machine has pulling ability on the right radial drive member, while said cable that makes contact with a frontal surface of said right radial drive member is fixed to a section of a surface of said right radial drive member with the ability to pull said surface with rotational ability, wherein said cable is then rerouted by a right pulley wheel member around a drive sprocket that is fixed to a drive shaft positioned on center of said right radial drive member, while a left pulley wheel member further reroutes said cable to wrap around a left radial drive member from back to front, wherein said left radial drive member is centrally positioned around said drive shaft, while said cable that makes contact with a surface of said left radial drive member from the back to the front is connected to a section of the surface of said left radial drive member with the ability to pull said surface with rotational ability, wherein the cable leads downward to be connected to a left member lever machine having pulling ability on said left radial drive member, wherein the right and left radial drive members have forward turn as well as backward slip ability on said drive shaft wherein said drive sprocket is fixed to said drive shaft to turn with the forward turn of each of the right and left radial drive members.

2. A lever propelled bicycle further comprising said right pulley wheel member of claim 1, wherein the right pulley wheel member is mounted to the right fork side of the bicycle's frame.

3. A lever propelled bicycle further comprising said left pulley wheel member of claim 1, wherein the left pulley wheel member is mounted to the left fork side of the bicycle's frame.

4. A lever propelled bicycle further comprising said fixed drive sprocket of claim 1, wherein the fixed drive sprocket interacts and engages a roller chain or belt which causes the roller chain or belt to rotate another radial drive member connected to a rear wheel of said bicycle, which turns the rear wheel of said bicycle as said fixed drive sprocket is being turned by the drive shaft.

5. A lever propelled bicycle further comprising the right and left radial drive members in claim 1, wherein the right and left radial drive member is vertically aligned to the respective right and left member lever machine.

\* \* \* \* \*